(12) United States Patent
Smith et al.

(10) Patent No.: US 12,038,892 B1
(45) Date of Patent: Jul. 16, 2024

(54) APPARATUS AND METHODS FOR DETERMINING A HIERARCHICAL LISTING OF INFORMATION GAPS

(71) Applicant: The Strategic Coach Inc., Toronto (CA)

(72) Inventors: Barbara Sue Smith, Toronto (CA); Daniel J. Sullivan, Toronto (CA)

(73) Assignee: The Strategic Coach Inc., Toronto (CA)

( * ) Notice: Subject to any disclaimer, the term of this patent is extended or adjusted under 35 U.S.C. 154(b) by 0 days.

(21) Appl. No.: 18/398,402

(22) Filed: Dec. 28, 2023

(51) Int. Cl.
- *G06N 3/048* (2023.01)
- *G06F 16/215* (2019.01)
- *G06F 16/28* (2019.01)

(52) U.S. Cl.
CPC .......... *G06F 16/215* (2019.01); *G06F 16/287* (2019.01); *G06N 3/048* (2023.01)

(58) Field of Classification Search
USPC ........................................................ 707/690
See application file for complete search history.

(56) References Cited

U.S. PATENT DOCUMENTS

| | | | |
|---|---|---|---|
| 2012/0124052 A1 | 5/2012 | Furey | |
| 2014/0279762 A1* | 9/2014 | Xaypanya | H04L 63/145 706/12 |
| 2014/0324747 A1 | 10/2014 | Crowder | |
| 2021/0064931 A1* | 3/2021 | Yang | G06V 20/46 |
| 2023/0274043 A1* | 8/2023 | Dong | G06T 11/00 703/1 |

FOREIGN PATENT DOCUMENTS

WO 2022/261247 A1 12/2022

\* cited by examiner

*Primary Examiner* — Cam Linh T Nguyen

(74) *Attorney, Agent, or Firm* — Caldwell Intellectual Property Law

(57) ABSTRACT

An apparatus for determining a hierarchical listing of information gaps for a user is provided. The apparatus includes a processor and a memory connected to the processor. The memory contains instructions configuring the processor to receive an instance of an identification datum from a user device, where the identification datum describes an output type from the user device at a time, receive a target status datum from a database connected to the processor, where the target status datum describes an optimal output type between a minimal output type and a maximum output type, and to classify the identification datum and the target status datum to categories representing identification data. The processor may identify an instance of a gap between identification data and display an input field to the user capable of displaying a hierarchical listing of information gaps based on a user-input datum.

20 Claims, 10 Drawing Sheets

"Thinking about Your Thinking" Scorecard

200C

| | Mindsets | 1 | 2 | 3 | 4 | 5 | 6 | 7 | 8 | 9 | 10 | 11 | 12 | Score Now | Score Next |
|---|---|---|---|---|---|---|---|---|---|---|---|---|---|---|---|
| 1 | Three Kinds (and a Fourth) | Life Filled with Confusing Material, No Understanding | | | Tired of Endless Talking about Others; Searching for New Options | | | Surrounded Yourself with Positive Things and People | | | Thinking about your Thinking | | | | |
| 2 | Things, People, and Thoughts | Thinking about Others has Left You Feeling Inferior, Deprived, Mistreated and Unhappy | | | Constantly Comparing what you Have with what Others Have | | | Continually Improve the Things, People and Thoughts in your Life | | | Understand that Thinking About others Forces You into Continual Comparison | | | | |
| 3 | Thinking about Your Thinking | Thinking is Increasingly Reactive and Apprehensive since Daily Experiences are filled with Frustration, Conflict and Failure | | | Looking for a New Way Out | | | Sticking to an Approach that's Practical and Agreeable | | | Increasingly Learn how to Improve your Behavior by Transforming your Thinking | | | | |
| 4 | Instantly Jump from "Normal" | Unhappy Because of your Self-Perceived Inferior Status | | | Suspected that there is a Whole other Dimension of Thinking | | | Successfully following Influential Individuals | | | Switching Out of your Normal Thinking | | | | |
| 5 | Energizingly Fresh and Exciting | Each new Day is an Energy-Draining Bore because its just a Repetitive Frustrating Experience | | | You've been Experiencing Exciting Glimpses of What's Possible | | | You've Continually been able to Move Ahead with Minimal Self-Reflection | | | Thinking about your Thinking provides you with a New Perspective that Energizes You | | | | |
| 6 | Surprising New Connections | Left Behind by Other People and Feel Disregarded, Helpless, and Mistreated by the World Outside | | | Aware that Obstacles and Deficiencies are caused by Inside your Thinking | | | Life has been about Improving your Status | | | Amazed that Departing from Normal Thinking in any Situation lets you see New 208C Meaning | | | 60 | |
| 7 | Rejuvenating Everything | Never been Creative about anything in Your Life 204C | | | Always found Creative Moments Perplexing and Frustrating but realize they are Self-Created | | | You've Learned how to Collect and Use Creative People | | | Independence from Constantly Thinking about Things, People and Thoughts makes you Increasingly Creative about Them | | | 14 | |
| 8 | Enabling Others to Transform | Thinking about Everything is Fixed in Place; Life is Bad, Nothing will Ever Get Better | | | Aware that You have to Improve your Thinking about Everything | | | Your Things, People and Thoughts are What You Want, Nothing's Needed | | | Thinking about your Thinking is Capable of also Transforming Other's Thinking | | | | |

APPARATUS AND METHODS FOR DETERMINING A HIERARCHICAL LISTING OF INFORMATION GAPS

FIELD OF THE INVENTION

The present invention generally relates to the field of artificial intelligence (AI). In particular, the present invention is directed to an apparatus and methods for data processing for determining a hierarchical listing of information gaps.

BACKGROUND

Computational efficiency militates in favor of heuristic descriptions of complex phenomena; however, such heuristics are only valuable inasmuch as they accurately represent the phenomena in question, and often fail for lack of systems to analyze a degree of inaccuracy in the heuristic itself.

SUMMARY OF THE DISCLOSURE

In an aspect, an apparatus for determining a hierarchical listing of information gaps is provided. The apparatus includes a processor and a memory connected to the processor. The memory contains instructions configuring the processor to receive a first identification datum from a user device, where the first identification datum describes a first output type from the user device at a first time. In addition, the processor may receive a second identification datum from the user device, where the second identification datum describes a second output type from the user device at a second time. Further, the processor may receive a target status datum from a database connected to the processor, where the target status datum describes an optimal output type between a minimal output type and a maximum output type. Accordingly, the processor may classify the first identification datum, the second identification datum, and the target status datum to a category of a plurality of categories representing identification data, identify a first gap datum between the first identification datum and the second identification datum and identify a second gap datum between the target status datum and the second identification datum. As a result, the processor may generate an interface data structure including an input field, where the interface query data structure configures a remote display device to display an input field, receive a user-input datum into the input field, where the user-input datum describes data for updating the second identification datum, and display a hierarchical listing of information gaps including hierarchically ranking the first gap datum and the second gap datum based on the user-input datum.

In another aspect, a method for determining a hierarchical listing of information gaps is provided. The method includes receiving, by a computing device, a first identification datum from a user device, where the first identification datum describes a first output type from the user device at a first time and receiving, by the computing device, a second identification datum from the user device, where the second identification datum describes a second output type from the user device at a second time. In addition, the method includes receiving, by the computing device, a target status datum from a database connected to the processor, where the target status datum describes an optimal output type between a minimal output type and a maximum output type and classifying, by the computing device, the first identification datum, the second identification datum, and the target status datum to a category of a plurality of categories representing identification data. Accordingly, the method includes identifying, by the computing device, a first gap datum between the first identification datum and the second identification datum and identifying, by the computing device, a second gap datum between the target status datum and the second identification datum. The method includes generating, by the computing device, an interface query data structure including an input field, where the interface query data structure configures a remote display device to display an input field, receive a user-input datum into the input field, wherein the user-input datum describes data for updating the second identification datum; and display the hierarchical listing of information gaps including hierarchically ranking the first gap datum and the second gap datum based on the user-input datum.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein:

FIG. 2C is a diagrammatic representation of another exemplary embodiment of output generated by an interface query data structure of FIGS. 2A-2B;

Figure 1:
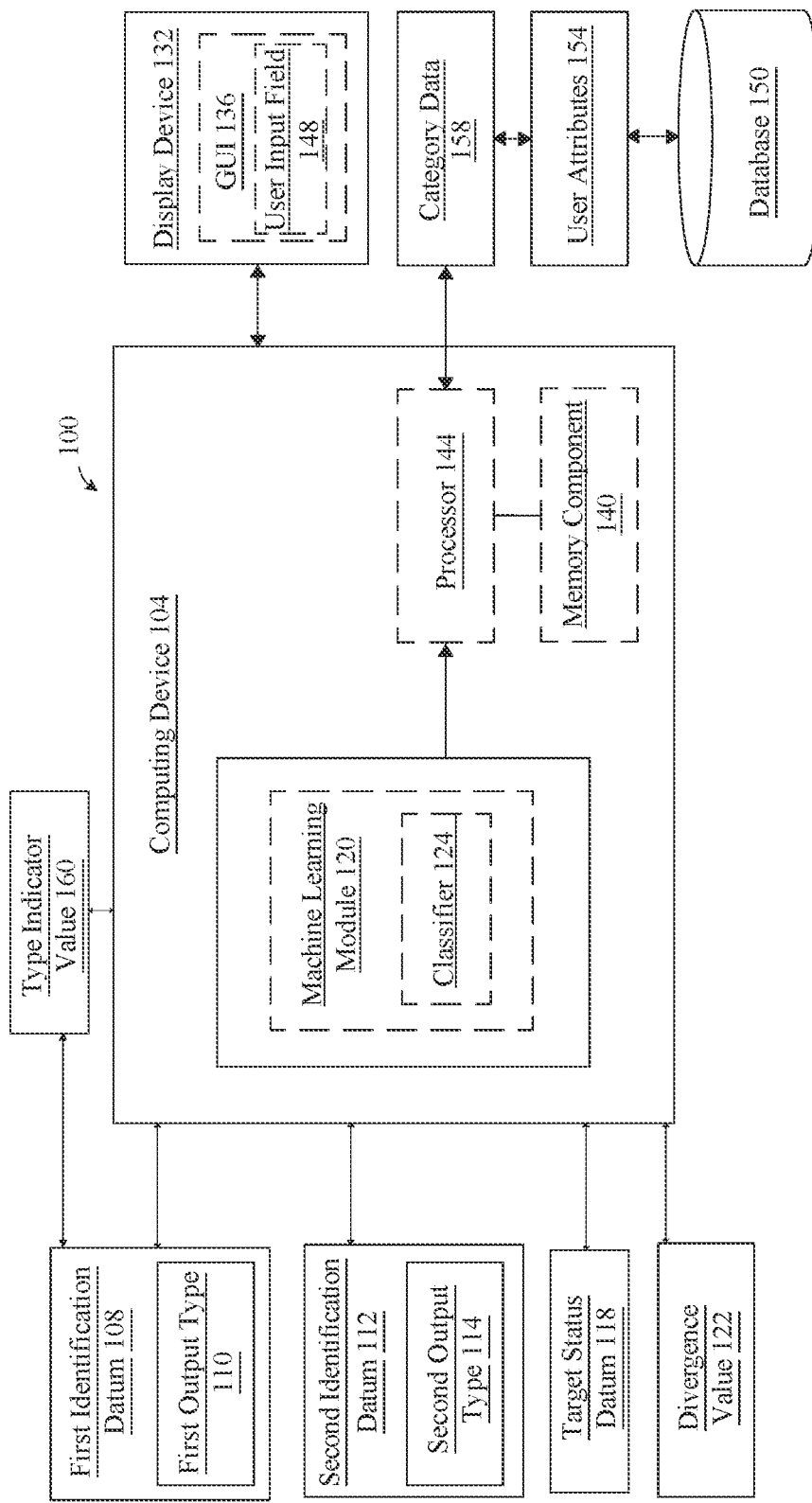
FIG. 1 is a block diagram of an embodiment of an apparatus for determining a hierarchical listing of information gaps for a user.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and methods for determining a hierarchical listing of information gaps for a user, the hierarchical listing describing several, such as in one or more "layers," which each describe an assessment of a particular set of circumstances or occurrences at a discrete point in time. More particularly, a "layer," as used herein, is defined as a computational comparison of data extracted at the discrete point in time compared against labels stored in a database communicatively connected with a user device of the user. That is, more particularly, advances in computational efficiency have permitted for more demanding resource and activity progress tracking. Such progress tracking can now digitally monitor various forms of complex phenomena, ranging from sophisticated new business formation initiatives, merger, acquisition and divestiture activity, or interpersonal reflection relating to thoughts, opinions, or other perspectives.

These circumstances or occurrences can collectively be referred to as "complex phenomena," and include "heuristics," which are shorter, or more efficient, ways of examining or analyzing circumstances and can involve using generalizations (such as captured using data clusters) to reduce cognitive load on a user or processing load on related computing devices executing the described processes. Such "heuristics" can be computationally used to shortcut data storage and subsequent manipulation of such data at one or more discrete time increments, described here as a "layer." That is, user progress regarding an enumerated set of activities, such as business management, self-improvement, self-reflection, and contemplation and the like, can be captured by data, referred to as a "layer," and later manipulated, tracked, and observed regarding changes in that data over time as extracted at subsequent time intervals, or additional "layers." Each "layer" may be compared against the labels to identify, categorize, and monitor user progress. However, heuristics, when used (or misused), in such a setting can result in irrational or potentially inaccurate conclusions should they include an underlying degree of undesirable inaccuracy. Therefore, using or applying such faulty heuristics can rapidly worsen or otherwise expand upon any underlying inaccuracies included within the affected heuristics. Aspects of the present disclosure recognize that failing to appropriately identify and eliminate inaccuracies prevalent within heuristics can result in unintended consequences, including data disruption, misidentification, and other errors. Accordingly, the disclosed apparatus includes a processor and a memory connected to the processor. The memory contains instructions configuring the processor to receive a first identification datum from a user device. The first identification datum describes a first output type, such as data describing a set of occurrences extracted at a first discrete point in time, also to be discussed further herein, from the user device at a first time. The processor receives a second identification datum from a user device. The second identification datum describes a second output type, such as describing an evolution of the earlier set of occurrences extracted at a second discrete point in time after the first discrete point in time, from the user device at a second time. The processor receives a target status datum from a database connected to the processor. The target status datum describes an optimal output type between a minimal output type and a maximum output type. The processor may classify the first identification datum, the second identification datum, and the target status datum to various categories representing identification data. The processor may identify a first gap between the first identification datum and the second identification datum. The processor may identify a second gap between the target status datum and the second identification datum.

In addition, the memory contains instructions configuring the processor to generate an "interface query data structure" including an input field based on ranking the first transfer datum and the second transfer datum. An "interface query data structure," as used in this disclosure, is an example of data structure used to "query," such as by digitally requesting, for data results from a database and/or for action on the data. "Data structure," in the field of computer science, is a data organization, management, and storage format that is usually chosen for efficient access to data. More particularly, a "data structure" is a collection of data values, the relationships among them, and the functions or operations that can be applied to the data. Data structures also provide a means to manage relatively large amounts of data efficiently for uses such as large databases and internet indexing services. Generally, efficient data structures are essential to designing efficient algorithms. Some formal design methods and programming languages emphasize data structures, rather than algorithms, as an essential organizing factor in software design. In addition, data structures can be used to organize the storage and retrieval of information stored in, for example, both main memory and secondary memory.

Therefore, "interface query data structure," as used herein, refers to, for example, a data organization format used to digitally request a data result or action on the data. In addition, the "interface query data structure" can be displayed on a display device, such as a digital peripheral, smartphone, or other similar device, etc. The interface query data structure may be generated based on received "user data," defined as including historical data of the user. Historical data may include attributes and facts about a user that are already publicly known or otherwise available. In some embodiments, interface query data structure prompts may be generated by a machine-learning model. As a non-limiting example, the machine-learning model may receive user data and output interface query data structure questions.

Here, "interface query data structure," is a data organization format used to digitally generate an input field based on, for example, hierarchically ranking the first gap and the second gap. The interface query data structure configures a remote display device to display the input field to the user, to receive a user-input datum into the input field, where the user-input datum describes data for updating the second identification datum, and to display the hierarchical listing of information gaps based on the user-input datum. That is, each gap, in some embodiments, describes incremental progress of the user across multiple discrete time increments such that an aggregation of such data, when also classified according to "layers" categorized to corresponding "labels" from a database, offers a holistic, data-driven, characterization of user developmental progress over time.

Accordingly, the memory contains instructions configuring the processor to generate an interface query data structure including an input field based on hierarchically ranking the first gap and the second gap, where the interface query data structure configures a remote display device to display the input field to the user; to receive a user-input datum into the input field, where the user-input datum describes data for updating the second identification datum, and to display the hierarchical listing of information gaps based on the user-input datum.

Referring now to FIG. 1, an exemplary embodiment of apparatus 100 for determining a hierarchical listing of information gaps for a user. In one or more embodiments, apparatus 100 includes computing device 104, which may include without limitation a microcontroller, microprocessor (also referred to in this disclosure as a "processor"), digital signal processor (DSP) and/or system on a chip (SoC) as described in this disclosure. Computing device 104 may include a computer system with one or more processors (e.g., CPUs), a graphics processing unit (GPU), or any combination thereof. Computing device 104 may include a memory component, such as memory component 140, which may include a memory, such as a main memory and/or a static memory, as discussed further in this disclosure below. Computing device 104 may include a display component (e.g., display device 132, which may be positioned remotely relative to computing device 104), as discussed further below in the disclosure. In one or more embodiments, computing device 104 may include, be included in, and/or communicate with a mobile device such as a mobile telephone or smartphone. Computing device 104 may include a single computing device operating independently, or may include two or more computing device operating in concert, in parallel, sequentially or the like; two or more computing devices may be included together in a single computing device or in two or more computing devices. Computing device 104 may interface or communicate with one or more additional devices, as described below in further detail, via a network interface device. Network interface device may be utilized for connecting computing device 104 to one or more of a variety of networks, and one or more devices. Examples of a network interface device include, but are not limited to, a network interface card (e.g., a mobile network interface card, a LAN card), a modem, any combination thereof, and the like. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Computing device 104 may include but is not limited to, for example, a computing device or cluster of computing devices in a first location and a second computing device or cluster of computing devices in a second location. Computing device 104 may include one or more computing devices dedicated to data storage, security, distribution of traffic for load balancing, and the like. Computing device 104 may distribute one or more computing tasks, as described below, across a plurality of computing devices of computing device 104, which may operate in parallel, in series, redundantly, or in any other manner used for distribution of tasks or memory between computing devices. Computing device 104 may be implemented using a "shared nothing" architecture in which data is cached at the worker, in an embodiment, this may enable scalability of apparatus 100 and/or computing device 104.

With continued reference to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, computing device 104 is configured to receive an element of first identification datum 108. For the purpose of this disclosure, a "first identification datum" is an element, datum, or elements of data describing a representation of a phenomenon, phenomena, or set of occurrences or circumstances extracted from a first discrete point in time. More particularly, in one or more embodiments, the "first identification datum" describes a "semantic representation," which, as used herein, is an abstract (such as formal) language in which meanings can be represented. For example, when a visual scene is interpreted, it may be represented semantically in a system as a network in which objects are identified and represented (as nodes), where their properties are represented by links to attributes, and their relationships to each other are represented by particular types of semantic links. In some embodiments, to digitally describe a visual scene may require the construction of data propositions, some of which may include truth-valued assertions about data and/or information gathered from a network and relating to the visual scene. The validity of these assertions can be evaluated, and they can consequently serve as a basis for digitally based discussion, inferences, and reasoning. A major task for a theory of digital cognitive representation is to identify the types of concepts and relations that are used by humans to interpret and represent their physical world as it is interpreted and described through "natural language."

That is, described machine learning processes executed by classifier 124 of machine learning module 120 may conduct "natural language processing," which as used herein is defined as an interdisciplinary subfield of linguistics, computer science, and artificial intelligence concerned with the interactions between computers and human language, in particular how to program computers to process and analyze large amounts of "natural language data," which describes any language that has evolved naturally in humans through use and repetition without conscious planning or premeditation. Returning to the example of a visual scene, disclosed computing device 104 may independently or via communicative coupling with one or more cameras, smart cameras, or other electronic devices capable of extracting or generating data representative of a visual scene, generate data representative of the visual scene. That is, computing device 104 may use "computer vision" in conjunction with connected cameras to digitally generate a natural-language based description of the visual scene. "Computer vision," as used herein, are methods for acquiring, processing, analyzing, and understanding digital images, and extraction of high-dimensional data from the real world to produce numerical or symbolic information, such as in the forms of decisions. The scientific discipline of computer vision relates to theories behind artificial systems that extract information from images, where image data can take many forms, such as video sequences, views from multiple cameras, multi-dimensional data from a 3D scanner, or medical scanning devices. Computer vision seeks to apply its theories and models to the construction of computer vision systems.

Still referring to FIG. 1, in the example provided above relating usage of computer vision systems to generate first identification datum 108, which may describe a semantic representation provided as a textual description of a visual scene, machine learning module 120 of computing device 104 may run natural language processing to process first datum as further described below. In addition, other example circumstances, scenarios, occurrences, or fact patterns may be represented by first identification datum 108. For example, first identification datum 108 may represent discrete data elements representative of one or more cognitive processes of one or more persons at a discrete point in time. That is, a user of computing device 104 may input, manually or otherwise (such as indirectly through a network communicatively coupled to computing device 104) indications of a cognitive process or initial self-evaluation, such as that shown by first category 204C, indicating "never been creative about anything in your life."

Still referring to FIG. 1, first identification datum 108, in such an example, describes data or one or more elements or attributes reflective or one or more discrete characteristics or traits indicative of first category 204C at a certain discrete point in time of the user's life, such as at age 22 upon graduation from college. "Creativity," as used herein, is a phenomenon whereby something new and valuable is formed, where the created item may be intangible or a physical object. Scholarly interest in creativity is found in several disciplines, primarily psychology, business studies, and cognitive science. In the context of demonstrated creativity in the visual arts, traits indicative of first category 204C may include relatively bland paintings or sculptures lacking any discernible originality of uniqueness of thought, where such distinctions can be captured by disclosed computer vision used by computing device 104 in conjunction with cameras capable of capturing the object, such as artwork or sculpture. Likewise, first identification datum 108 may describe other discrete, discernable, tangible traits, elements, or characteristics of other forms of subject matter, including self-reflection or contemplation, by capturing and digitally describing such discrete, discernable traits. Lack of creativity, accordingly, can be described by first identification datum 108 in the context of self-reflection by, for example, tracking data describing discrete indicators of the following: innovation, activity differentiation, viewpoint rigidity, inability to solve complex problems, failure to exploit unique and unusual opportunities, limited crisis response capabilities, and the like.

With continued reference to FIG. 1, first identification datum 108, reflective of, for example, a phenomenon including a semantic representation, is taken at a discrete point in time, such as at age 22 of the user as described earlier. This time corresponds to a "layer," which as defined earlier, describes user progress regarding an enumerated set of activities, such as business management, self-improvement, self-reflection, and contemplation and the like as extracted at a particular discrete point in time. Accordingly, first identification datum 108 can be tracked over time as represented by multiple additional and subsequent "layers," of which second identification datum 112 is an additional "layer". That is, "second identification datum," as used herein, is a "metarepresentation," or a higher-order representation of a lower-order representation embedded within taken at a second discrete point in time subsequent to the first discrete point in time. Those skilled in the art will appreciate that one or more additional identification datum, such as a "third identification datum" and a "fourth identification datum" and the like, may also be received by computing device 104 in the manner described for first identification datum 108 and second identification datum 112 as described here, each datum corresponding to a subsequent "layer" used to identify, categorize, and monitor user progress. Classifier 124 of machine learning module 120 may classify such "layered" datum, which is first identification datum 108 and second identification datum 112, against various groups stored in mindset evaluation database 300, to categorize and discretely organize systematic user progress in their mindset across one group to the other. For example, data describing negative self-reflection viewpoints may be collectively stored in initial category datum 312 and data describing improvements of such negative self-reflection viewpoints may be stored in subsequent category datum. Incremental improvement of user self-reflection may result in classification of second identification datum 112 with subsequent category datum 316, which may correspond to or trigger display of second category 208C in scorecard 200C. More particularly, second category 208C indicates that the user is "amazed that departing from normal thinking in any situation lets you see new meaning," and may displayed pursuant to the described processes determining a hierarchical listing of information gaps including identifying second gap datum 112 between target status datum 118 and second identification datum 112.

In addition, in one or more embodiments, computing device 104 includes memory component 140 connected to processor 144. Memory component 140 contains instructions configuring processor 144 to receive first identification datum 108 from a user device (not shown in FIG. 1). The user device may be a computing device, smartphone, tablet, computer, peripheral and the like, which is capable of communicatively connecting with computing device 104. More particularly, first identification datum 108 describes a first output type (not shown in FIG. 1) from the user device at a first time.

Still referring to FIG. 1, first output type 110 is included within first identification datum 108. That is, in one or more embodiments, first identification datum 108, which may describe data representative of a phenomenon as described earlier, may be received by processor 144. In addition, computing device 104 may receive type indicator value 160, which may describe data, elements, or attributes of circumstances surrounding the phenomenon. In one or more embodiments, type indicator value 160 may be received to be classified, by classified 124, to target status datum 118 to define the "type" of identification datum. That is, "type," as used herein," is a metadescription relating to how the underlying circumstances described by first identification datum 108 arose. For example, in the earlier example of describing a visual scene, the "type" may be what type of visual scene, whether that may be outdoors during a sunny and pleasant spring day, or indoors in a photography studio for professional headshot photos and the like. Computing device 104 may communicate with database 150 to retrieve additional data or categorical value for organizing first identification datum 108 according to type indicator value 160. In some embodiments, classifier 124 may use any described machine learning process described herein to classify first identification datum 108 to discrete categorical elements or data from database 150 to correspondingly generate first output type 110, which may accordingly describe the type of first identification datum. Similarly, processor 144 may perform like processes to generate second output type 114 for second identification datum 112.

Accordingly, upon processor 144 generating each first output type 110 and second output type 144, processor may systematically communicate, such as at one or more discrete time intervals, with database 150 communicatively connected to processor 144 to, for example, classify first identification datum 108 and second identification datum 112 according to their respective first output type 110 and second output type 114 based on their corresponding "layers," that is the discrete time and date at which the respective datum was extracted or generated based on actual phenomena and the like. Given that second identification datum 112 is generated or extracted after first identification datum 112, the described processes may describe favorable progression as shown by second category 208C relative to first category 204C.

In some embodiments, first identification datum 108 may be input into computing device 104 manually from the user device by the user, who may be associated with or representative of any type or form of establishment (e.g., a business, university, non-profit, charity, etc.), or may be an independent entity (e.g., a solo proprietor, an athlete, an artist, etc.). In some instances, first identification datum 108 may be extracted from a business profile, such as that may be available via the Internet on LinkedIn®, a business and employment-focused social media platform that works through websites and mobile apps owned my Microsoft® Corp., of Redmond, WA). More particularly, such a business profile may include the past achievements of a user in various fields such as business, finance, and personal, depending on one or more particular related circumstances. Persons skilled in the art, upon reviewing the entirety of this disclosure, will be aware of various other ways or situations in which first identification datum 108 may be input, generated, or extracted for various situations and goals. For example, in an example where the user is a business, first identification datum 108 may be extracted from or otherwise be based on the client's business profile, which may include various business records such as financial records, inventory record, sales records, and the like. In addition, in one or more embodiments, first identification datum 108 may be generated by evaluating interactions with external entities, such as third parties. More particularly, in a business-related context, such an example external entity (or third party) may be that offered by Moody's Investors Services, Inc., Moody's Analytics, Inc. and/or their respective affiliates and licensors, of New York, NY. Services rendered may include providing international financial research on bonds issued by commercial and government entities, including ranking the creditworthiness of borrowers using a standardized ratings scale which measures expected investor loss in the event of default. In such an example, first identification datum 108 extracted from such an external entity may include ratings for debt securities in several bond market segments, including government, municipal and corporate bonds, as well as various managed investments such as money market funds and fixed-income funds and financial institutions including banks and non-bank finance companies and asset classes in structured finance.

In addition, or the alternative, in one or more embodiments, first identification datum 108 may be acquired using web trackers or data scrapers. As used herein, "web trackers" are scripts (e.g., programs or sequences of instructions that are interpreted or carried out by another program rather than by a computer) on websites designed to derive data points about user preferences and identify. In some embodiments, such web trackers may track activity of the user on the Internet. Also, as used herein, "data scrapers" are computer programs that extract data from human-readable output coming from another program. For example, data scrapers may be programmed to gather data on user from user's social media profiles, personal websites, and the like. In some embodiments, first identification datum 108 and second identification datum 112 (to be further described herein) may be numerically quantified (e.g., by data describing discrete real integer values, such as 1, 2, 3 . . . n, where n=a user-defined or prior programmed maximum value entry, such as 10, where lower values denote lesser significance relating to favorable business operation and higher values denote greater significance relating to favorable business operation). For example, for classifying an element describing a pattern of first identification datum 108 (e.g., of an entrepreneur) to target status datum 118 in the context of assessment and reassessment of mental health, wellbeing, and self-consciousness, in financial services and retirement planning, first identification datum 108 may equal "3" for an entrepreneur, such as a person active in delivering motivational speeches and coursework, etc., suffering low self-esteem and constant jealously of others, such as "Thinking about Others has left Them Feeling Inferior, . . . etc." as indicated by scorecard 200C of FIG. 2C, a "5" for only "Looking for a New Way Out," and an "8" for positive self-reflection, such as that indicated by second category 208C for "Amazed that Departing from Normal Thinking in any Situation lets you see New Meaning," etc. Categorical data associated with scorecard 200C may be stored as category data 138 and displayed by display device 132 by the described processes.

Other example values are possible along with other exemplary attributes and facts about a client (e.g., a business entity, or an aspiring athlete) that are already known and may be tailored to a particular situation where explicit business guidance (e.g., provided by the described progression sequence) is sought. In one or more alternative embodiments, first identification datum 108 and/or second identification datum 112 may be described by data organized in or represented by lattices, grids, norms, etc., and may be adjusted or selected as necessary to accommodate particular client-defined circumstances or any other format or structure for use as a calculative value that a person skilled in the art would recognize as suitable upon review of the entirety of this disclosure.

In one or more embodiments, first identification datum 108 may be provided to or received by computing device 104 using various means. In one or more embodiments, first identification datum 108 may be provided to computing device 104 by a business, such as by a human authorized to act on behalf of the business including any type of executive officer, an authorized data entry specialist or other type of related professional, or other authorized person or digital entity (e.g., software package communicatively coupled with a database storing relevant information) that is interested in improving and/or optimizing performance of the business overall, or in a particular area or field over at a first time and/or a defined duration assessed from the first time, such as a quarter or six months since the first time has elapsed. In some examples, a human may manually enter first identification datum 108 and/or second identification datum 112 into computing device 104 using, for example, user input field 148 of graphical user interface (GUI) 136 of display device 132. For example, and without limitation, a human may use display device 132 to navigate the GUI 136 and provide first identification datum 108 and/or second identification datum 112 to computing device 104. Non-limiting exemplary input devices include keyboards, joy sticks, light pens, tracker balls, scanners, tablets, microphones, mouses, switches, buttons, sliders, touchscreens, and the like. In other embodiments, first identification datum 108 and/or second identification datum 112 may be provided to computing device 104 by a database over a network from, for example, a network-based platform. First identification datum 108 and/or second identification datum 112 may be stored, in one or more embodiments, in database 150 and communicated to computing device 104 upon a retrieval request from a human and/or other digital device (not shown in FIG. 1) communicatively connected with computing device 104. In other embodiments, first identification datum 108 and/or second identification datum 112 may be communicated from a third-party application, such as from a third-party application on a third-party server, using a network. For example, first identification datum 108 and/or second identification datum 112 may be downloaded from a hosting website for a particular area, such as a networking group for small business owners in a certain city, or for a planning group for developing new products to meet changing client expectations, or for performance improvement relating to increasing business throughput volume and profit margins for any type of business, ranging from smaller start-ups to larger organizations that are functioning enterprises. In one or more embodiments, computing device 104 may extract first identification datum and/or second identification datum 112 108 from an accumulation of information provided by database 150. For instance, and without limitation, computing device 104 may extract needed information database 150 regarding improvement in a particular area sought-after by the business and avoid taking any information determined to be unnecessary. This may be performed by computing device 104 using a machine-learning model, which is described in this disclosure further below.

At a high level, and as used herein, "machine-learning" describes a field of inquiry devoted to understanding and building methods that "learn"—that is, methods that leverage data to improve performance on some set of defined tasks. Machine-learning algorithms may build a machine-learning model based on sample data, known as "training data," to make predictions or decisions without being explicitly programmed to do so. Such algorithms may function by making data-driven predictions or decisions by building a mathematical model from input data. This input data used to build the machine-learning model may be divided into multiple data sets. In one or more embodiments, three data sets may be used in different stages of the creation of the machine-learning model: training, validation, and test sets.

Described machine-learning models may be initially fit on a training data set, which is a set of examples used to fit parameters. Here, example training data sets suitable for preparing and/or training described machine-learning processes may include data relating to historic business operations under historic circumstances, or circumstances in certain enumerated scenarios, such as during a period low interest rates or relatively easy bank lending, or during a period of highly restrictive fiscal policy implemented to control and address undesirably high inflation. Such training sets may be correlated to similar training sets of user attributes 154 relating to particular attributes of the user. In the described example of first identification datum 108 relating to a business, user attributes 154 may describe one or more elements, datum, data and/or attributes relating to client engagement with services provided by the user. For example, a business may require financing to launch and can approach a bank (e.g., a type of user) for one or more types of loans.

In this example, user attributes 154 may describe or relate to data describing retail, regional, or even investment banks. In addition, user attributes may include data describing liquidity available to customers (e.g., clients) and performance of outstanding loans and other products. In addition, first identification datum 108 and/or second identification datum 112 may include data describing a pattern of activity or conduct undertaken by the user regarding acquisition of goods or services from a third party and the resultant mental state or condition of the user based on the relationship between the user and the third party. In banking, that may mean that a user may choose to assess risk in relatively difficult macroeconomic conditions as dictated by higher-than-average federal interest rates, etc., and base their initial assessment of their corresponding conjectures, predispositions, analysis and/or mental states on such an assessment. For example, should a residential property bought as an investment to generate rental income be perceived as unduly risky due to a combination of high interest rates and a relatively undesirable geographic location of the property, circumstances may be represented by data describing "Looking for a New Way Out," or more specifically, "They're Frustrated by the Limitations to Thinking about Things, People, and Thoughts and they're Looking for a Way Out." This means that the user is considering alternative residential real estate options.

In addition, in one or more embodiments, computing device 104 is configured to receive an element of second identification datum 112. For the purpose of this disclosure, a "second identification datum" is an element, datum, or elements of data describing a self-reflection upon the initial circumstance represented by first identification datum 108. More particularly, the "second identification datum" describes the ability to witness and evaluate one's own cognitive, emotional, and behavioral processes. In psychology, other terms used for this self-observation include "reflective awareness," and "reflective consciousness." In addition, second identification datum 112 may describe user information, work habits, skill, client relationships, and the like. Accordingly, in one or more embodiments, processor 144 may receive second identification datum 112 from the user device. Second identification datum 112 describes a second output type from the user device at a second time. More particularly, second output type 114 describes how that circumstance is digitally represented in the disclosed apparatus at a first time, such as when the circumstance is digitally represented. This way, disclosed processes may track data describing thoughts, as well as self-reflective conjecture at multiple discrete time assessment points, thereby facilitating the tracking of a desired positive evolution of self-reflective phenomena as mediated by the described equipment and processes.

In addition, in one or more embodiments, memory contains instructions configuring processor 144 to receive target status datum 118 from database 150, which is communicatively connected to processor 144. Target status datum 118 describes an optimal output type between a "minimal output type" and a "maximum output type". As used herein and also in the fields of computer science and data science, a "minimal output type," also referred to as a "minimum value," is the smallest mathematical value in a given data set. Here, a "minimal output type" may include elements, datum or data describing mindsets that are the most negative out of the possible mindsets listed in display screen 200C, such as for "rejuvenating everything," indicated by first category 204C as "never been creative about anything in your life." Any combination of numerical or non-numerical representations or values may be used as or within the "minimal output type," provided that such representations or values describe a most-negative mindset scenario, which may be manually input by a user of the described processes or extracted automatically. In contrast, a "maximum output type" may describe the opposite of a "minimum output type" and thereby refer to the largest mathematical value in a given data set. Here, a "maximum output type" may include elements, datum or data describing mindsets that are the most negative out of the possible mindsets listed in display screen 200C, such as for "surprising new connections," indicated by second category 208C as "never been creative about anything in your life." As a result, target status datum 118 describes an optimal output type between the "minimal output type" and the "maximum output type" as described above, and thereby includes data describing an optimal state of self-reflective consciousness regarding one's own life progression as defined by, for example, a sequence of multiple interconnected discrete life events, such as graduating college, securing a first job, being promoted to a more senior position within an organization, etc. In some embodiments, the apex of such self-reflective consciousness is denoted by the mindset identified as "Enabling Others to Transform," most notably within scoring levels 10-12, denoted as "Thinking about your Thinking is Capable of Also Transforming Other's Thinking."

Accordingly, processor 144 may classify (as further described herein and shown by FIG. 4) first identification datum 108, second identification datum 112, and target status datum 118 to a category (such as first category 204C) of multiple categories 200C of FIG. 2C, each category representing identification data. In this way, processor 144 may identify a first gap (such as described by gap datum 122) between first identification datum 108 and second identification datum 112, where identifying the first gap comprises subtracting first identification datum 108 from second identification datum 112. That is, more particularly, should first identification datum 108 have a numerical value of "14," as shown in the "Score Now" box for row "7" in scorecard 200C of FIG. 2C, and that data describes the user as having the mindset of "Rejuvenating Everything," then first identification datum may be divided by the row within the "Mindsets" column. In one or more embodiments, the row within the "Mindsets" column may be selected by the described processes based on data relating to any described datum, including first identification datum 108, second identification datum 112, as well as user-input datum 224A, to be described further herein. Here, that is "7." Therefore, "14"÷"7"="2," resulting in category 204 within row 7 being identified, selected, and/or displayed by the described processes. As shown in FIG. 2C, first category 204C describes a relatively negative self-outlook of the user, such that the user has self-identified as "Never [having] been Creating about anything in Their Life." In addition, processor 144 may identify a second gap (also capable of being described by another instance of gap datum 122) between target status datum 118 and second identification datum 112. Identifying the second gap includes subtracting second identification datum 112 from target status datum 118. That is, target status datum 118 may have a numerical value of "60" as shown in the "Score Now" box for row "6," corresponding to "Surprising New Connections." Accordingly, "60"÷"6"="10," resulting in second category 208C within row 7 being identified, selected, and/or displayed by the described processes.

The first gap and the second gap, as described above, may describe data indicative of gradual progression of the user from a negative self-reflective mental state to a positive self-reflective mental state incrementally over the passage of a defined duration of time. That is, first identification datum 108 may be categorized in first category 204C and second identification datum 112 may be categorized elsewhere by the described processes in some other category prior to target status datum 118. More particularly, second identification datum 112 (not shown in FIG. 2C) may be less than "60" and calculated to be located in a different row and/or column than second category 208C. Accordingly, the second gap may describe a numerical distance required for traversal to reach target status datum 118 categorized in second category 208C. In this way, the user can monitor their self-reflective activities relating to, as described earlier, "thinking about thinking" to ensure favorable progression towards a more positive world outlook and commensurate productivity reflected in their choice of progression, such as generating more and/or better work product and/or developing new business, etc.

Accordingly, processor 144 may generate an interface query data structure, as described above, including an input field based on hierarchically ranking the first gap and the second gap. The interface query data structure configures a remote display device (such as display device 132) to display the input field to the user and to receive user-input datum 224A into user-input field 220A. In some embodiments, user-input datum may describe data for updating second identification datum 112 (such as based on progressive improvement in user-self outlook) and display the hierarchical listing of information gaps based on the user-input datum.

In addition, in some embodiments, generating the interface query data structure includes retrieving data describing attributes (such as user attributes 154) of the user from database 150 communicatively connected to processor 144, and generating the interface query data structure based on the data describing attributes of the user. Further, in one or more embodiments, generating target status datum 118 includes retrieving data describing current preferences of the user device between a minimum value and a maximum value from database 150 and generating the interface query data structure based on the data describing current preferences of the user device.

In some embodiments, determining the hierarchical listing of information gaps includes classifying an instance of first identification datum 108 to target status datum 118, ranking an instance of first identification datum 108 to target status datum 118 based on a proximity of a respective first identification datum 108 to the target status datum 118 calculated based on the first gap, and adjusting target status datum 118 based on ranking by either decreasing or increasing target status datum 118 such that the proximity of first identification datum 108 relative to target status datum 118 is lessened.

In addition, in one or more embodiments, determining the hierarchical listing of information gaps includes determining a threshold datum (not shown in FIG. 1) by classifying data describing a pattern that is representative of user interaction with database 150 to first identification datum 108. Further, in some embodiments, determining the hierarchical listing of information gaps includes adjusting the pattern that is representative of user interaction with database 150 to the first identification datum by either increasing or decreasing user interaction with database 150. Still further, in some embodiments, determining the hierarchical listing of information gaps includes classifying first identification datum to a category selected from categories based on the pattern that is representative of client interaction with the user.

A "classifier," which as used in this disclosure is a machine-learning model as defined below, such as a mathematical model, neural net, or program generated by a machine-learning algorithm known as a "classification algorithm," as described in further detail below, that sorts inputs into categories or bins of data, outputting the categories or bins of data and/or labels associated therewith. A classifier may be configured to output a datum that labels or otherwise identifies a set of data that are clustered together, found to be close under a distance metric as described below, or the like. A distance metric may include any norm, such as, without limitation, a Pythagorean norm. As to be described in further detail below in FIG. 4, machine-learning module 400, which may be one example of classifier 124 of computing device 104 of FIG. 1, may generate a classifier using a classification algorithm, defined as a process whereby a computing device and/or any module and/or component operating thereon derives a classifier from training data 404.

"Classification" is a supervised machine learning method or process that may be executed or otherwise run by classifier 124, which may use machine learning module 120 to execute a machine learning model responsible for predicting a correct label of a given input data. In classification, a machine learning model can be fully trained using "training data," and then later evaluated on test data before being used to perform prediction on new unseen data.

"Training data," as used herein, is data containing correlations that a machine-learning process may use to model relationships between two or more categories of data elements. For instance, and without limitation, training data, in this instance, may include multiple data entries, each entry representing a set of data elements that were recorded, received, and/or generated together and described various confidence levels or traits relating to demonstrations of confidence. Data elements may be correlated by shared existence in a given data entry, by proximity in a given data entry, or the like. Multiple categories of data elements may be related in training data according to various correlations, which may indicate causative and/or predictive links between categories of data elements, which may be modeled as relationships such as mathematical relationships by machine-learning processes as described in further detail below. In addition, training data may be formatted and/or organized by categories of data elements, for instance by associating data elements with one or more descriptors corresponding to categories of data elements.

Here, training data can include data describing phenomena representative of activity sequences or processes for self-reflection or evaluation based on intake of discrete descriptive data points. That is, relating to the "three kinds (and a fourth)" category shown in display screen 200C, initial scoring levels (shown horizontally in display screen 200C) from 1-3 may correspond to data describing a negative outlook for a user's self-reflection indicated as "life filled with confusing material; no understanding." Similarly, in the "instantly jump from 'normal'" mindset category, initial scoring levels from 1-3 may correspond "unhappy because of your self-perceived inferior status" and so on. Such data describing related negative self-assessments can form initial parameters used in training data, which can also include intermediary parameters and operational excellence, denoted between scores 10-12. That is, returning to the "three kinds (and a fourth)" category shown in display screen 200C, scoring levels, from 10-12 may correspond to data describing a positive or optimal outlook for a user's self-reflection indicated as "thinking about your thinking," which can include, for example, metadescriptions relating to how the underlying circumstances described by first identification datum 108 arose. Such training data describing various aspects of self-reflection phenomena can set parameters used to "train," or otherwise prepare, described machine learning processes to classify first identification datum 108, second identification datum 112, and target status datum 118 to a category of a plurality of categories (e.g., of category data 158) representing identification data.

In some embodiments, any described machine learning model disclosed herein may be initially fit on a training data set, as described above, such as using data representative of certain extreme or boundary mental conditions as a set of examples used to fit the parameters (e.g., weights of connections between neurons in artificial neural networks) of the model. The model (e.g., a naive Bayes classifier) is trained on the training data set using a supervised learning method, for example using optimization methods such as gradient descent or stochastic gradient descent. In practice, the training data set often consists of pairs of an input norm (or scalar) (e.g., described by or represented by data indicative of first category 204C) and the corresponding output norm (or scalar), where the answer key is commonly denoted as the target (or label) (e.g., described by or represented by data indicative of second category 208C). A current model may be run with the training data set and produce a result, which is then compared with the target, for each input norm in the training data set. A "norm," as used herein, is defined as a data value, or set of data analytical processes, used to evaluate the error of a model, such as any of the machine learning models described herein. For instance, it is used to calculate the error between the output of a neural network and what is expected (the actual value or label) or can be used in defining a regularization term which includes the magnitude of the weights, to encourage small weights. Here, training data sets can include multiple types, instances, or variants of data represented by mindsets and associated categories shown by display screen 200C of FIG. 2C. Based on the result of the comparison and the specific learning algorithm being used, the described norms and/or parameters (e.g., what aspects of training data can be used) of the model may be adjusted. The model fitting can include both variable selection and parameter estimation.

Figure 2B:
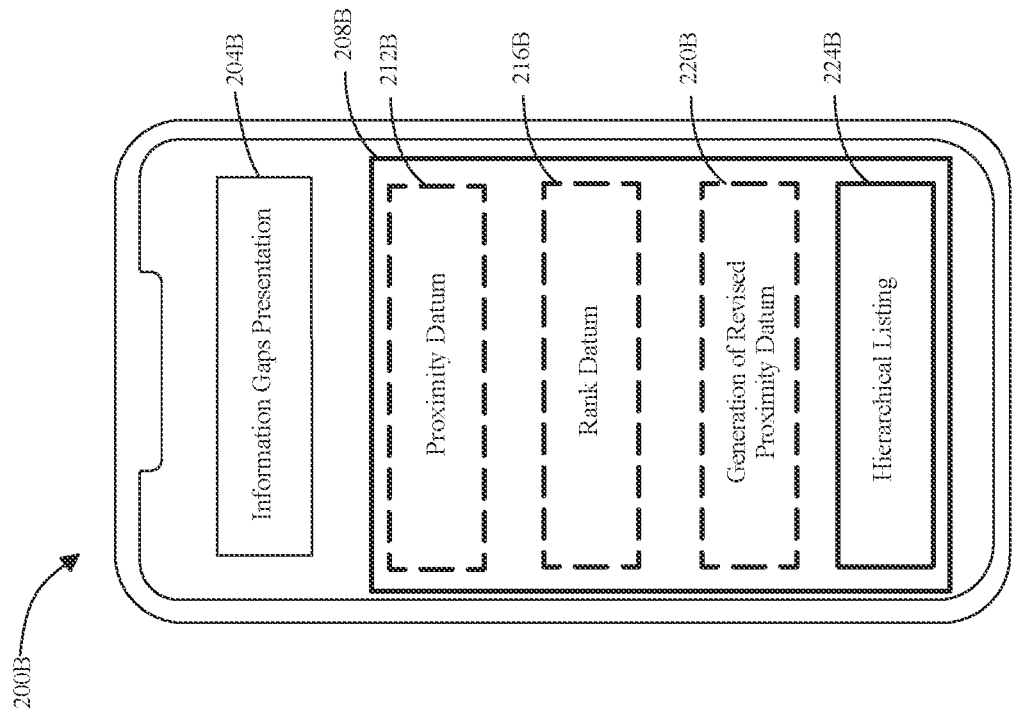
FIGS. 2A-2B are diagrammatic representations of multiple exemplary embodiments of output generated by an interface query data structure.
Figure 2A:
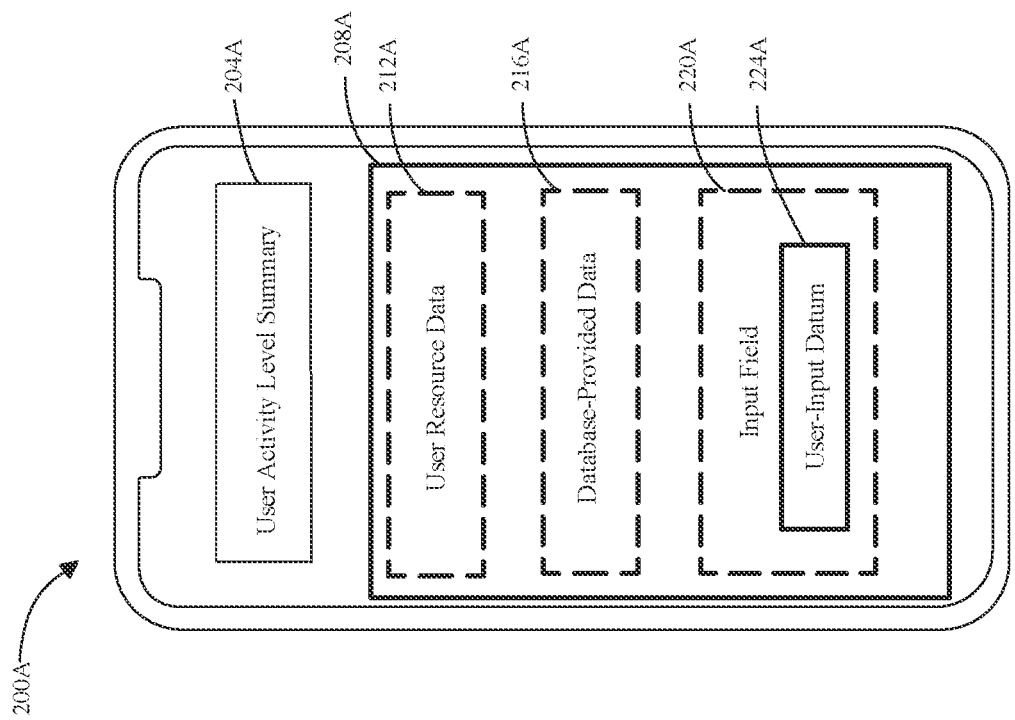

Still referring to FIG. 1, in some embodiments, computing device 104 is configured to evaluate user-input datum 224A of FIG. 2A by classifying, such as by using classifier 124, first identification datum 108, second identification datum 112, and target status datum 118 to a category (e.g., as associated with data describing first category 204C, second category 208C, and the like as shown in display screen 200) of a plurality of categories (e.g., provided by category data 148) representing identification data (e.g., provided by user attributes 154). Accordingly, processor 144 may identify a first gap datum (not shown in FIG. 1) between first identification datum 108 and second identification datum 112 and identify a second gap datum (not shown in FIG. 1) between target status datum 118 and second identification datum 112. As generally introduced earlier, classification processes described herein may include a supervised machine learning method where the model tries to predict a correct label of a given input data. In classification, a machine learning model may be fully trained using training data as described earlier, such as training using various metadescriptions relating to how the underlying circumstances described by first identification datum 108 arose. Next, the machine learning model may be evaluated on test data before being used to perform prediction on new unseen data.

Generally, there are two types of learners in machine learning classification: "lazy" and "eager" learners. "Eager" learners are machine learning algorithms that first build a model from the training dataset before making any prediction on future datasets. They spend more time during the training process because of their eagerness to have a better generalization during the training from learning the weights, but they require less time to make predictions. Certain machine learning algorithms may be considered to be such "eager" learning algorithms as described here, including logistic regression, support norm machine, decision trees, and artificial neural networks.

Still referring to FIG. 1, more particularly, in some embodiments, neural networks learn (or are trained) by processing examples, each of which contains a known "input," such as, first identification datum 108, second identification datum 112, and target status datum 118, and "results," such as, identification of the first gap datum between the first identification datum and the second identification datum and identification a second gap datum between the target status datum and the second identification datum for determining a hierarchical listing of information gaps. This may be facilitated by forming probability-weighted associations between the "input" and the "result," which are stored within the data structure of the net itself. The training of a neural network from a given example is usually conducted by determining the difference between the processed output of the network (often a prediction) and a target output. This difference is the error. The network then adjusts its weighted associations according to a learning rule and using this error value. Successive adjustments can cause the neural network to produce output that is increasingly similar to a desired target output. After a sufficient number of these adjustments, the training can be terminated based on certain criteria. This is a form of supervised learning.

Such systems "learn" to perform tasks by considering examples, generally without being programmed with task-specific rules. For example, in image recognition, they might learn to identify images that contain cats by analyzing example images that have been manually labeled as "cat" or "no cat" and using the results to identify cats in other images. They do this without any prior knowledge of cats, for example, that they have fur, tails, whiskers, and cat-like faces. Instead, they automatically generate identifying characteristics from the examples that they process. Here, such systems can "learn" based on parameters defined by training data, such as first category 204C indicative of data describing a certain set of circumstances, such as "never been creative bout anything in your life." Accordingly, such training data can guide classification of where new data, such as provided by user-input datum 224A into input field 220A, where user-input datum 224A describes data for updating at least second identification datum 112. As a result, a user using the described processes may incrementally improve their self-reflection mindset and periodically input such updated information through user-input datum 224A to update at least second identification datum 112 as related to determining a hierarchical listing of information gaps, where such gaps incrementally decrease in size or significance based on improvements in user self-reflection. That is, in practice, target status datum 118 may including elements, datum or data describing second category 208C, which describes the self-reflective mindset of "amazed that departing from normal thinking in any situation lets you see new meaning." As a result, should incremental user improvement in self-reflection over time, as indicated by user-input datum 224A describing data for updating at least second identification datum 112 matching target status datum 118 as shown by second category 208C in display screen 200C, the described processes may accordingly display a hierarchical listing of information gaps (e.g., in a screen similar to display screen 200C) including hierarchically ranking the first gap datum and the second gap datum based on user-input datum 224A.

In addition, in some embodiments, classifying first identification datum 108 to a category of various categories includes "aggregating" an instance of first identification datum 108 based on the classification as described above, and further classifying aggregated user data to data describing the pattern that is representative of client interaction with the user device. "Aggregating," as used herein, is the compiling of information from databases with intent to prepare combined datasets for data processing. Accordingly, aggregating can include various data manipulative operations including (but not limited to) calculating sums, products, arithmetic/multiplicative means, weighted averages, or other types of machine learning model calculated results or outputs that output an aggregated value. That is, examples provided above relating to any discussed datum are not limited to usage of only one instance of that datum and also, as discussed here, include aggregations of datum. More particularly, in some embodiments, aggregate data refers to numerical or non-numerical information that is (1) collected from multiple sources and/or on multiple measures, variables, or individuals, and (2) compiled into data summaries or summary reports, typically for the purposes of public reporting or statistical analysis, such as examining trends, making comparisons, or revealing information and insights that would not be observable when data elements are viewed in isolation. For example, information about whether individual students graduated from high school can be aggregated—that is, compiled and summarized-into a single graduation rate for a graduating class or school, and annual school graduation rates can then be aggregated into graduation rates for districts, states, and countries and so on. For instance, a supervised learning algorithm (or any other machine-learning algorithm described herein) may include one or more instances of any datum described herein, including first identification datum 108, second identification datum 112, target status datum 118 and/or gap datum 122 describing self-reflection process of a user as described above as inputs. In addition, and as described earlier, computing device 104 of FIG. 1 may receive user-input datum 224A into input field 148 of display device 132. User-input datum 224A may describe data for selecting a preferred attribute (e.g., progressive increases in self-confidence, etc.). In addition, in some embodiments, the user may dictate target status datum 118, or it may be externally provided by database 510. Classifier 124 of machine-learning module 120 may classify one or more instances of first identification datum 108 and/or second identification datum 112 and/or gap datum 122 to, for example, target status datum 118. Accordingly, in some embodiments, classifier 124 may classify one or more instances of first identification datum 108 and/or second identification datum 112 and/or gap datum 122 that more closely relate to or resemble target status datum 118 within a closer proximity to target status datum 118.

In this way, a scoring function (such as that used to generated scores shown in the "Score Now" and/or "Score Next" columns in scorecard 200C of FIG. 2C) representing a desired form of relationship to be detected between inputs and outputs may be used by described machine learning processes. Such as scoring function may, for instance, seek to maximize the probability that a given input (e.g., data describing perseverance relating to confidence) and/or combination of elements and/or inputs (e.g., data describing confidence overall) is associated with a given output (e.g., a hierarchical display of multiple instances of gap datum 122 describing progressive improvement regarding self-awareness) to minimize the probability that a given input (e.g., data describing low self-esteem) is not associated with a given potentially inappropriate output (e.g., additional discouraging overconfidence).

In some embodiments, generating the hierarchical listing of information gaps for a user further includes adjusting the pattern that is representative of user interaction with described processes on gap datum 122. In addition, in some instances, generating the instruction set further includes classifying first identification datum 108 to one or more categories based on the pattern that is representative of client interaction with the user.

Still further, described processes executed by machine-learning module 120 of computing device 104 may generate an output (e.g., hierarchical listing 224B) inclusive of a text and/or digital media-based content describing a strategy recommendation for progressively improving self-reflection as a function of, for example, target status datum 118, first identification datum 108, and the user score, where the strategy recommendation may also be generated using a machine learning model as to be further described below In some instances, in one or more embodiments, computing device 104 is configured to receive an element of target status datum 118. In addition, or the alternative, computing device 104 is configured to receive one or more instances of an "outlier cluster," as used for methods described in U.S. patent application Ser. No. 18/141,320, filed on Apr. 28, 2023, titled "METHOD AND AN APPARATUS FOR ROUTINE IMPROVEMENT FOR AN ENTITY," and, U.S. patent application Ser. No. 18/141,296, filed on Apr. 28, 2023, titled "SYSTEMS AND METHODS FOR DATA STRUCTURE GENERATION," both of which are incorporated herein by reference herein in their respective entireties. As described earlier and throughout this disclosure, a "target status datum" describes an optimal output type, which is an optimal state of circumstances, whether that be an ideal visual scene, business performance, or self-reflective consciousness. Accordingly, in this example, target status datum 118 may be determined or identified using one or more outlier clusters. More particularly, described machine-learning processes may use, as inputs, one or more instances of first identification datum 108, second identification datum 112, transfer datum 116, target status datum 118 and/or gap datum 122 in combination with the other data described herein, and use one or more associated outlier cluster elements with target outputs, such as hierarchical listing 224B. As a result, in some instances, classifier 124 may classify inputs to target outputs including associated outlier cluster elements to generate hierarchical listing 224B.

In addition, and without limitation, in some cases, database 150 may be local to computing device 104. In another example, and without limitation, database 150 may be remote to computing device 104 and communicative with computing device 104 by way of one or more networks. A network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which computing device 104 connects directly, dynamically, and non-hierarchically to as many other computing devices as possible. A "network topology" as used in this disclosure is an arrangement of elements of a communication network. Network may use an immutable sequential listing to securely store database 150. An "immutable sequential listing," as used in this disclosure, is a data structure that places data entries in a fixed sequential arrangement, such as a temporal sequence of entries and/or blocks thereof, where the sequential arrangement, once established, cannot be altered, or reordered. An immutable sequential listing may be, include and/or implement an immutable ledger, where data entries that have been posted to the immutable sequential listing cannot be altered.

Database 150 may include keywords. As used in this disclosure, a "keyword" is an element of word or syntax used to identify and/or match elements to each other. For example, without limitation, a keyword may be "finance" in the instance that a business is seeking to optimize operations in the financial services and/or retirement industry. In another non-limiting example, keywords of a key-phrase may be "luxury vehicle manufacturing" in an example where the business is seeking to optimize market share internationally, or certain rapidly developing markets. Database 150 may be implemented, without limitation, as a relational database, a key-value retrieval datastore such as a NOSQL database, or any other format or structure for use as a datastore that a person skilled in the art, upon reviewing the entirety of this disclosure, would recognize as suitable upon review of the entirety of this disclosure.

With continued reference to FIG. 1, a "classifier," as used in this disclosure is type or operational sub-unit of any described machine-learning model or process executed by machine-learning module 120, such as a mathematical model, neural net, or program generated by a machine-learning algorithm known as a "classification algorithm" that distributes inputs into categories or bins of data, outputting the categories or bins of data and/or labels associated therewith. A classifier may be configured to classify and/or output a datum (e.g., one or more instances of any one or more of first identification datum 108, second identification datum 112, transfer datum 116, and/or target status datum 118 as well as other elements of data produced, stored, categorized, aggregated or otherwise manipulated by the described processes) that labels or otherwise identifies a set of data that are clustered together, found to be close under a distance metric, or the like.

Referring again to FIG. 1, computing device 104 may be configured to identifying business impact by using classifier 124 to classify one or more instances of any one or more of first identification datum 108, second identification datum 112, transfer datum 116, and/or target status datum 118 based on user attributes 154 and/or category data 158. Accordingly, classifier 124 of machine-learning module 120 may classify attributes within user attributes 154 related to demonstrating one or more repayment behaviors toward reaching or exceeding target status datum 118.

In addition, in some embodiments, machine-learning module 120 performing the described correlations may be supervised. Alternatively, in other embodiments, machine-learning module 120 performing the described correlations may be unsupervised. In addition, classifier 124 may label various data (e.g., one or more instances of any one or more of first identification datum 108, second identification datum 112, transfer datum 116, and/or target status datum 118 as well as other elements of data produced, stored, categorized, aggregated, or otherwise manipulated by the described processes) using machine-learning module 120. For example, machine-learning module 120 may label certain relevant parameters of one or more instances of first identification datum 108 with parameters of one or more user attributes 154.

In addition, machine-learning processes performed by machine-learning module 120 may be trained using one or more instances of category data 158 to, for example, more heavily weigh or consider instances of category data 158 deemed to be more relevant to the business. More specifically, in one or more embodiments, category data 158 may be based on or include correlations of parameters associated with first identification datum 108 to parameters of user attributes 154. In addition, category data 158 may be partially based on earlier iterations of machine-learning processes executed by machine-learning module 120. In some instances, running machine-learning module 120 over multiple iterations refines correlation of parameters or data describing entity operations (e.g., associated with first identification datum 108) with parameters describing user attributes 154.

Classification may be performed using, without limitation, linear classifiers such as without limitation logistic regression and/or naive Bayes classifiers, nearest neighbor classifiers such as k-nearest neighbors classifiers, support norm machines, least squares support norm machines, fisher's linear discriminant, quadratic classifiers, decision trees, boosted trees, random forest classifiers, learning norm quantization, and/or neural network-based classifiers.

Still referring to FIG. 1, computing device 104 may be configured to generate a classifier using a Naïve Bayes classification algorithm. Naïve Bayes classification algorithm generates classifiers by assigning class labels to problem instances, represented as norms of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)\div P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Computing device 104 may then calculate a likelihood table by calculating probabilities of different data entries and classification labels. Computing device 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when norms are binary.

With continued reference to FIG. 1, computing device 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in norm forms, and using one or more measures of norm similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

Further referring to FIG. 1, generating k-nearest neighbors algorithm may generate a first norm output containing a data entry cluster, generating a second norm output containing an input data, and calculate the distance between the first norm output and the second norm output using any suitable norm such as cosine similarity, Euclidean distance measurement, or the like. Each norm output may be represented, without limitation, as an n-tuple of values, where n is two values. Each value of n-tuple of values may represent a measurement or other quantitative value associated with a given category of data, or attribute, examples of which are provided in further detail below; a norm may be represented, without limitation, in n-dimensional space using an axis per category of value represented in n-tuple of values, such that a norm has a geometric direction characterizing the relative quantities of attributes in the n-tuple as compared to each other. Two norms may be considered equivalent where their directions, and/or the relative quantities of values within each norm as compared to each other, are the same; thus, as a non-limiting example, a norm represented as [5, 10, 15] may be treated as equivalent, for purposes of this disclosure, as a norm represented as [1, 2, 3]. Norms may be more similar where their directions are more similar, and more different where their directions are more divergent; however, norm similarity may alternatively or additionally be determined using averages of similarities between like attributes, or any other measure of similarity suitable for any n-tuple of values, or aggregation of numerical similarity measures for the purposes of loss functions as described in further detail below. Any norms as described herein may be scaled, such that each norm represents each attribute along an equivalent scale of values. Each norm may be "normalized," or divided by a "length" attribute, such as a length attribute l as derived using a Pythagorean norm: $l=\sqrt{\Sigma_{i=0}^{n} a_i^2}$, where $a_i$ is attribute number i of the norm. Scaling and/or normalization may function to make norm comparison independent of absolute quantities of attributes, while preserving any dependency on similarity of attributes; this may, for instance, be advantageous where cases represented in training data are represented by different quantities of samples, which may result in proportionally equivalent norms with divergent values.

Referring now to FIGS. 2A-2B, exemplary embodiments of user input field 148 as configured to be displayed by GUI 136 of display device 132 based on an interface query data structure are illustrated. More particularly, in some embodiments, the interface query data structure further may configure the remote display device to provide an articulated graphical display including multiple regions organized in a tree structure format, where each region provides one or more instances of point of interaction between the user and the remote display device. As defined earlier, an "interface query data structure" refers to, for example, a data organization format used to digitally request a data result or action on the data (e.g., stored in a database). In one or more embodiments, each output screen 200A-200B may be an example of an output screen configured to be displayed by display device 132 of FIG. 1 by the described interface query data structure. That is, more particularly, the described interface query data structure may configure display device 132 of FIG. 1 to display any one or more of output screens 200A-200B as described in the present disclosure. Accordingly, output screen 200A may include multiple forms of indicia.

In one or more embodiments, output screen 200A and output screen 200B may be examples of user input field 148 and/or GUI 136 as displayed by display device 132, which may be a "smart" phone, such as an iPhone, or other electronic peripheral or interactive cell phone, tablet, etc. Output screen 200A may be a screen initially displayed to a user (e.g., a human or a human representing or acting on behalf of a business or some other entity, and have user engagement area 208 including identification field 204A, user resource data field 212A, database-provided data field 216A, user-input field 220A, which may include one or more instances of user-input datum 224A describing data for selecting a preferred attribute of any one or more repayment behaviors associated with one or more instances of first identification datum 108.

In addition, in one or more embodiments, user-input datum 224A may be reflective of and/or provide a basis for user attributes 154. Persons skilled in the art, upon reviewing the entirety of this disclosure, will be aware of various ways in which fewer or additional interactive user input fields may be displayed by screen 208A. Identification field 204A may identify described processes performed by processor 144 of computing device 104 by displaying identifying indicia, such as "Client-User Interaction Summary" as shown in FIG. 2A to permit, for example, a human to interact with GUI 136 and input information relating to a field of choice (e.g., business operations), through (for example) interactivity provided by identification field 204A.

Such information can include data describing activities performed by the business relating to the business achieving its defined goal (e.g., target status datum 118 of FIG. 1). In some instances, a human may select from one or more options (not shown in FIG. 2A) relating to prompts provided by identification field 204A to input such information relating to specific details of, for example, the business. In addition, in some embodiments, any of the described fields may include interactive features, such as prompts, permitting for a human to select additional textual and/or other digital media options further identifying or clarifying the nature of the business relating to the respective specifics of that field. For example, user resource data field 212A may display assessments of corresponding instruction sets regarding relevance and potential for positive impact on the business and may thereby also provide interactive features permitting the human to input additional data or information relating to expectations of positive of negative assessments for a given instruction set. Such additional human-input data may be computationally evaluated by described machine-learning processes executed by machine-learning module 120 and thereby correspondingly appear in the described progression sequence.

Like output screen 200A, output screen 200B may be an example of a screen subsequently shown to a human as described earlier based on human-provided input to any one or more of the displayed fields. That is, output screen 200B may display "Instruction Set for User" in identification field 204B as indicating completion of intake of human-provided input and that described machine-learning processes have completed described classifying processes to output customized information gap assessment area 208B to the user. For example, in one or more embodiments, customized information gap assessment area 208B may also include multiple human-interactive fields, including proximity datum identification field 212B, rank datum field 216B, generation of revised proximity datum field 220B, and hierarchical listing 224B generated as described earlier.

Persons skilled in the art, upon reviewing the entirety of this disclosure, will be aware of various ways in which fewer or additional interactive human input fields may be displayed by output screen 200B. Each field within customized information gap assessment area 208B may display any combination of human interactive text and/or digital media, each field intending to provide specific data-driven feedback directed to optimizing ongoing business performance of the business. Various example types of specifics (e.g., "decrease risky leverage in high interest rate conditions") are shown in customized information gap assessment area 208B, but persons skilled in the art will be aware of other example types of feedback, each of which being generated as suitable for a given business by processor 144. In addition, in one or more embodiments, any one or more fields of customized information gap assessment area 208B may be human-interactive, such as by posing a query for the human to provide feedback in the form of input such that described machine-learning processes performed by machine-learning module 120 may intake refined input data and correspondingly process related data and provide an updated customized information gap assessment area 208B. In some embodiments, such processes may be performed iteratively, thereby allowing for ongoing refinement, redirection, and optimization of customized information gap assessment area 208B to better meet the needs of the client or user.

Figure 3:
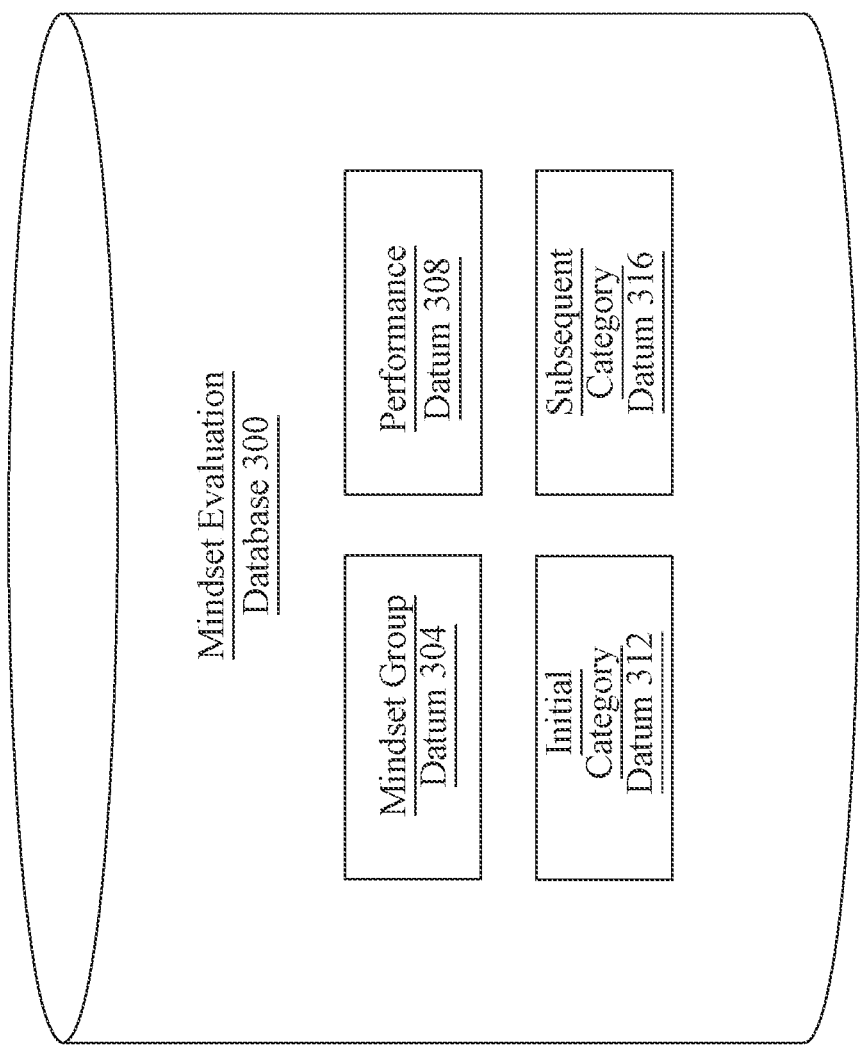
FIG. 3 is a diagrammatic representation of a mindset evaluation categorization database.

Referring now to FIG. 3, an exemplary embodiment of mindset evaluation database 300 is illustrated. In one or more embodiments, mindset evaluation database 300 may be an example of database 150 of FIG. 1. Query database may, as a non-limiting example, organize data stored in the user activity database according to one or more database tables. One or more database tables may be linked to one another by, for instance, common column values. For instance, a common column between two tables of expert database may include an identifier of a query submission, such as a form entry, textual submission, or the like, for instance as defined below; as a result, a query may be able to retrieve all rows from any table pertaining to a given submission or set thereof. Other columns may include any other category usable for organization or subdivision of expert data, including types of query data, identifiers of interface query data structures relating to obtaining information from the user, times of submission, or the like. Persons skilled in the art, upon reviewing the entirety of this disclosure, will be aware of various ways in which user activity data from one or more tables may be linked and/or related to user activity data in one or more other tables.

In addition, in one or more embodiments, computing device 104 may be configured to access and retrieve one or more specific types of user attributes 154 and/or other data types, e.g., one or more instance of first identification datum 108, second identification datum 112, transfer datum 116 and/or target status datum 118, as well as gap datum 122, categorized in multiple tables from mindset evaluation database 300. For example, as shown in FIG. 3, mindset evaluation database 300 may be generated with multiple categories including mindset group datum 304, performance datum 308, initial category datum 312 and subsequent category datum 316. Consequently, the described processes may classify one or more instances of first identification datum 108 from mindset group datum 304 to second identification datum 112 and/or user-input datum 224A that may be input user input field 148 of FIG. 1. In some instances, user-input datum 224A may describe data for selecting a preferred attribute of any one or more skills associated with one or more instances of transfer datum 116. In addition, described processes may retrieve data describing additional attributes related to the preferred attribute of transfer datum 116 from mindset evaluation database 300 connected with the processor based on mindset group datum 304 (e.g., or, alternatively, one or more of performance datum 308, initial category datum 312, and/or subsequent category datum 316, etc.).

Figure 4:
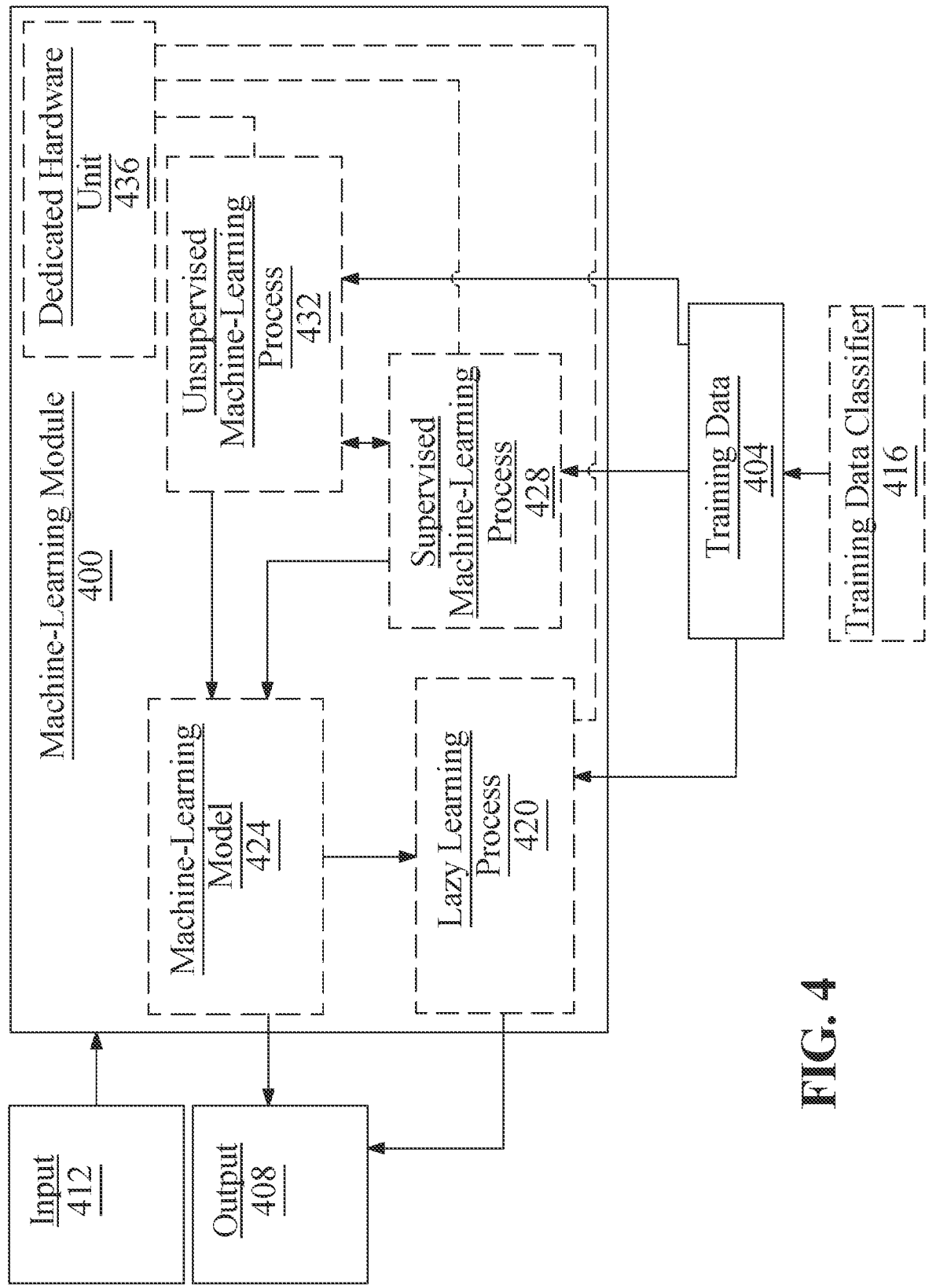
FIG. 4 is a block diagram of exemplary machine-learning processes.

Referring now to FIG. 4, an exemplary embodiment of a machine-learning module 400 that may perform one or more machine-learning processes as described in this disclosure is illustrated. In one or more embodiments, machine-learning module 400 may be an example of machine-learning module 120 of computing device 104 of FIG. 1. Machine-learning module 120 may perform determinations, classification, and/or analysis steps, methods, processes, or the like as described in this disclosure using machine-learning processes. A "machine-learning process," as used in this disclosure, is a process that automatedly uses training data 404 to generate an algorithm instantiated in hardware or software logic, data structures, and/or functions that will be performed by a computing device/module (e.g., computing device 104 of FIG. 1) to produce outputs 408 given data provided as inputs 412; this is in contrast to a non-machine-learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include multiple data entries, also known as "training examples," each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure.

As a non-limiting illustrative example, input data may include one or more instances of any one or more of first identification datum 108, second identification datum 112, transfer datum 116, and/or target status datum 118, as well as category data 158 and/or user attributes 154, to provide the instruction set as may be determined as described earlier, such as where some instances of the transfer datum 116 exceeding a threshold (e.g., that may be user-defined and input into user input field 148, or externally defined) are aggregated to define and display the instruction set to the user. In addition, in one or more embodiments, the interface query data structure as described herein includes one or more interface query data structures, any one of which may include an interface that defines a set of operations supported by a data structure and related semantics, or meaning, of those operations. For example, in the context of personal performance improvement coaching, interface query data structure may include one or more interface query data structures that may appear to the user in the form of one or more text-based or other digital media-based surveys, questionnaires, lists of questions, examinations, descriptions, etc.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a data structure representing and/or using a mathematical model, neural net, or program generated by a machine-learning algorithm known as a "classification algorithm," as described in further detail below, that sorts inputs into categories or bins of data, outputting the categories or bins of data and/or labels associated therewith. A classifier may be configured to output a datum that labels or otherwise identifies a set of data that are clustered together, found to be close under a distance metric as described below, or the like. A distance metric may include any norm, such as, without limitation, a Pythagorean norm. Machine-learning module 400 may generate a classifier using a classification algorithm, defined as a process whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/ or neural network-based classifiers. As a non-limiting example, training data classifier 416 may classify elements of training data to iteratively refine the instruction set to reflect the user's preferences, such as by preparing hierarchical listing 224B for the user to more effectively and/or efficiently progress to match target status datum 118.

With further reference to FIG. 4, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 4, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may identify as having poor quality data, where "poor quality" is defined as having a signal to noise ratio below a threshold value.

As a non-limiting example, and with further reference to FIG. 4, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 4, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units In some embodiments, and with continued reference to FIG. 4, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine-learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 4, machine-learning processes as described in this disclosure may be used to generate machine-learning models 424. A "machine-learning model," as used in this disclosure, is a data structure representing and/or instantiating a mathematical and/or algorithmic representation of a relationship between inputs and outputs, as generated using any machine-learning process including without limitation any process as described above and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes for providing a skill factor (e.g., of transfer datum 116) hierarchy to a user. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include one or more instances of any one or more of first identification datum 108, second identification datum 112, transfer datum 116, and/or target status datum 118, as well as category data 158 and/or user attributes 154 as described above as inputs, hierarchical listing 224B and/or similar textual and/or visual imagery (e.g., digital photos and/or videos) relating to providing hierarchical listing 224B to a user as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of a supervised machine-learning process 428 that may be used to determine relation between inputs and outputs. Supervised machine-learning processes may include classification algorithms as defined above.

With further reference to FIG. 4, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 4, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 4, machine-learning processes may include at least an unsupervised machine-learning processes 432. At least an unsupervised machine-learning process, as used herein, is a process that derives inferences in datasets without regard to labels; as a result, an unsupervised machine-learning process may be free to discover any structure, relationship, and/or correlation provided in the data. Unsupervised processes 432 may not require a response variable; unsupervised processes 432 may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 4, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 4, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 4, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 4, one or more processes or algorithms described above may be performed by at least a dedicated hardware unit 436. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 436 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 436 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 436 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 5:
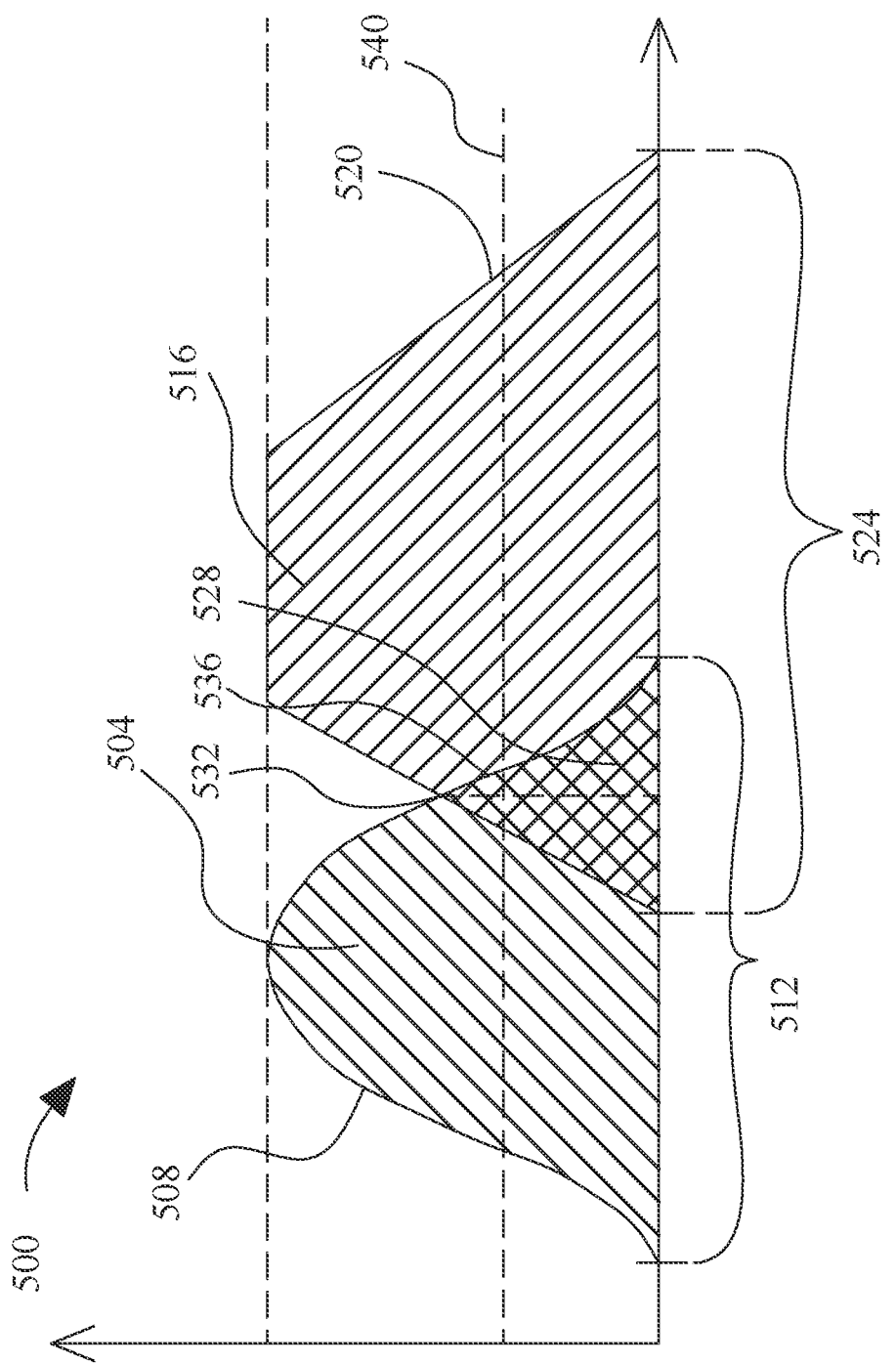
FIG. 5 is a graph illustrating an exemplary relationship between fuzzy sets.

Referring to FIG. 5, an exemplary embodiment of fuzzy set comparison 500 is illustrated. In one or more embodiments, data describing any described process relating to providing a skill factor hierarchy to a user as performed by processor 144 of computing device 104 may include data manipulation or processing including fuzzy set comparison 500. In addition, in one or more embodiments, usage of an inference engine relating to data manipulation may involve one or more aspects of fuzzy set comparison 500 as described herein. That is, although discrete integer values may be used as data to describe, for example, one or more instances of any one or more of first identification datum 108, second identification datum 112, transfer datum 116, and/or target status datum 118, as well as category data 158 and/or user attributes 154, fuzzy set comparison 500 may be alternatively used. For example, a first fuzzy set 504 may be represented, without limitation, according to a first membership function 508 representing a probability that an input falling on a first range of values 512 is a member of the first fuzzy set 504, where the first membership function 508 has values on a range of probabilities such as without limitation the interval [0,1], and an area beneath the first membership function 508 may represent a set of values within first fuzzy set 504. Although first range of values 512 is illustrated for clarity in this exemplary depiction as a range on a single number line or axis, first range of values 512 may be defined on two or more dimensions, representing, for instance, a Cartesian product between a plurality of ranges, curves, axes, spaces, dimensions, or the like. First membership function 508 may include any suitable function mapping first range of values 512 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 5, first fuzzy set 504 may represent any value or combination of values as described above, including output from one or more machine-learning models, one or more instances of any one or more of first identification datum 108, second identification datum 112, transfer datum 116, and/or target status datum 118, as well as category data 158 and/or user attributes 154, and a predetermined class, such as without limitation, query data or information including interface query data structures stored in mindset evaluation database 300 of FIG. 3. A second fuzzy set 516, which may represent any value which may be represented by first fuzzy set 504, may be defined by a second membership function 520 on a second range of values 524; second range of values 524 may be identical and/or overlap with first range of values 512 and/or may be combined with first range via Cartesian product or the like to generate a mapping permitting evaluation overlap of first fuzzy set 504 and second fuzzy set 516. Where first fuzzy set 504 and second fuzzy set 516 have a region 528 that overlaps, first membership function 508 and second membership function 520 may intersect at a point 532 representing a probability, as defined on probability interval, of a match between first fuzzy set 504 and second fuzzy set 516. Alternatively, or additionally, a single value of first and/or second fuzzy set may be located at a locus 536 on first range of values 512 and/or second range of values 524, where a probability of membership may be taken by evaluation of first membership function 508 and/or second membership function 520 at that range point. A probability at 528 and/or 532 may be compared to a threshold 540 to determine whether a positive match is indicated. Threshold 540 may, in a non-limiting example, represent a degree of match between first fuzzy set 504 and second fuzzy set 516, and/or single values therein with each other or with either set, which is sufficient for purposes of the matching process; for instance, threshold may indicate a sufficient degree of overlap between an output from one or more machine-learning models one or more instances of any one or more of first identification datum 108, second identification datum 112, transfer datum 116, and/or target status datum 118, as well as category data 158 and/or user attributes 154 and a predetermined class, such as without limitation, query data categorization, for combination to occur as described above. Alternatively, or additionally, each threshold may be tuned by a machine-learning and/or statistical process, for instance and without limitation as described in further detail below.

Further referring to FIG. 5, in an embodiment, a degree of match between fuzzy sets may be used to classify one or more instances of any one or more of first identification datum 108, second identification datum 112, transfer datum 116, and/or target status datum 118, to as well as category data 158 and/or user attributes 154 stored in mindset evaluation database 300. For instance, if first identification datum 108 and/or interface query data structure 112 has a fuzzy set matching certain interface query data structure data values stored in mindset evaluation database 300 (e.g., by having a degree of overlap exceeding a threshold), computing device 104 may classify one or more instances of any one or more of first identification datum 108, second identification datum 112, transfer datum 116, and/or target status datum 118 as belonging to user attributes 154 (e.g., aspects of user behavior as demonstrated by user attributes 154 of FIG. 1 and/or performance datum 308 of FIG. 3 relating to user commitment towards achieving target status datum 118). Where multiple fuzzy matches are performed, degrees of match for each respective fuzzy set may be computed and aggregated through, for instance, addition, averaging, or the like, to determine an overall degree of match.

Still referring to FIG. 5, in an embodiment, first identification datum 108 and/or second identification datum 112 may be compared to multiple mindset evaluation database 300 categorization fuzzy sets. For instance, first identification datum 108 and/or second identification datum 112 may be represented by a fuzzy set that is compared to each of the multiple mindset evaluation database 300 categorization fuzzy sets; and a degree of overlap exceeding a threshold between the first identification datum 108 and/or second identification datum 112 fuzzy set and any of the mindset evaluation database 300 categorization fuzzy sets may cause computing device 104 to classify one or more instances of any one or more of first identification datum 108, second identification datum 112, transfer datum 116, and/or target status datum 118 as belonging to one or more corresponding interface query data structures associated with mindset evaluation database 300 categorization (e.g., selection from categories in mindset evaluation database 300, etc.). For instance, in one embodiment there may be two mindset evaluation database 300 categorization fuzzy sets, representing, respectively, mindset evaluation database 300 categorization (e.g., into each of mindset group datum 304, performance datum 308, initial category datum 312, and/or subsequent category datum 316). For example, a First mindset evaluation database 300 categorization may have a first fuzzy set; a Second mindset evaluation database 300 categorization may have a second fuzzy set; and one or more instances of any one or more of first identification datum 108, second identification datum 112, transfer datum 116, and/or target status datum 118, to as well as category data 158 and/or user attributes 154 may each have a corresponding fuzzy set.

Computing device 104, for example, may compare one or more instances of any one or more of first identification datum 108, second identification datum 112, transfer datum 116, and/or target status datum 118, to as well as category data 158 and/or user attributes 154 fuzzy sets with fuzzy set data describing each of the categories included in mindset evaluation database 300, as described above, and classify one or more instances of any one or more of first identification datum 108, second identification datum 112, transfer datum 116, and/or target status datum 118, to as well as category data 158 and/or user attributes 154 to one or more categories (e.g., mindset group datum 304, performance datum 308, initial category datum 312, and/or subsequent category datum 316). Machine-learning methods as described throughout may, in a non-limiting example, generate coefficients used in fuzzy set equations as described above, such as without limitation x, c, and σ of a Gaussian set as described above, as outputs of machine-learning methods. Likewise, any described datum herein may be used indirectly to determine a fuzzy set, as, for example, first identification datum 108 fuzzy set and/or second identification datum 112 fuzzy set may be derived from outputs of one or more machine-learning models that take first identification datum 108 and/or second identification datum 112 directly or indirectly as inputs.

Still referring to FIG. 5, a computing device may use a logic comparison program, such as, but not limited to, a fuzzy logic model to determine a mindset evaluation database 300 response. A mindset evaluation database 300 response may include, but is not limited to, accessing and/or otherwise communicating with any one or more of mindset group datum 304, performance datum 308, initial category datum 312, subsequent category datum 316, and the like; each such mindset evaluation database 300 response may be represented as a value for a linguistic variable representing mindset evaluation database 300 response or in other words a fuzzy set as described above that corresponds to a degree of matching between data describing first identification datum 108 and/or second identification datum 112 and one or more categories within mindset evaluation database 300 as calculated using any statistical, machine-learning, or other method that may occur to a person skilled in the art upon reviewing the entirety of this disclosure.

In some embodiments, determining a mindset evaluation database 300 categorization may include using a linear regression model. A linear regression model may include a machine-learning model. A linear regression model may be configured to map data of first identification datum 108 and/or second identification datum 112, to one or more mindset evaluation database 300 parameters. A linear regression model may be trained using a machine-learning process. A linear regression model may map statistics such as, but not limited to, quality of first identification datum 108 and/or second identification datum 112. In some embodiments, determining mindset evaluation database 300 of first identification datum 108 and/or second identification datum 112 may include using a mindset evaluation database 300 classification model. A mindset evaluation database 300 classification model may be configured to input collected data and cluster data to a centroid based on, but not limited to, frequency of appearance, linguistic indicators of quality, and the like. Centroids may include scores assigned to them such that quality of first identification datum 108 and/or second identification datum 112 may each be assigned a score.

In some embodiments, mindset evaluation database 300 classification model may include a K-means clustering model. In some embodiments, mindset evaluation database 300 classification model may include a particle swarm optimization model. In some embodiments, determining the mindset evaluation database 300 of first identification datum 108 and/or second identification datum 112 may include using a fuzzy inference engine (e.g., to assess the progress of the user and use said data to amend or generate new strategies based on user progress). A fuzzy inference engine may be configured to map one or more instances of any one or more of first identification datum 108, second identification datum 112, transfer datum 116, and/or target status datum 118, to as well as category data 158 and/or user attributes 154 data elements using fuzzy logic. In some embodiments, the described datum may be arranged by a logic comparison program into mindset evaluation database 300 arrangement. A "mindset evaluation database 300 arrangement" as used in this disclosure is any grouping of objects and/or data based on similarity to each other and/or relation to providing hierarchical listing 224B of FIG. 2B to the user for the user to achieve. This step may be implemented as described above in FIG. 1.

Membership function coefficients and/or constants as described above may be tuned according to classification and/or clustering algorithms. For instance, and without limitation, a clustering algorithm may determine a Gaussian or other distribution of questions about a centroid corresponding to a given scoring level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 5, an inference engine may be implemented to assess the progress of the user and use said data to amend or generate new strategies based on user progress according to input and/or output membership functions and/or linguistic variables. For instance, a first linguistic variable may represent a first measurable value pertaining to first identification datum 108 and/or second identification datum 112, such as a degree of matching between data describing user aspirations and strategies based on responses to interface query data structures stored in mindset evaluation database 300. Continuing the example, an output linguistic variable may represent, without limitation, a score value. An inference engine may combine rules, such as: "if the demonstrated commitment level of a person or business falls beneath a threshold," and "the observed performance of the person or business relative to their or its peers is deficient," the commitment score is 'deficient'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively, or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/ Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

Figure 6:
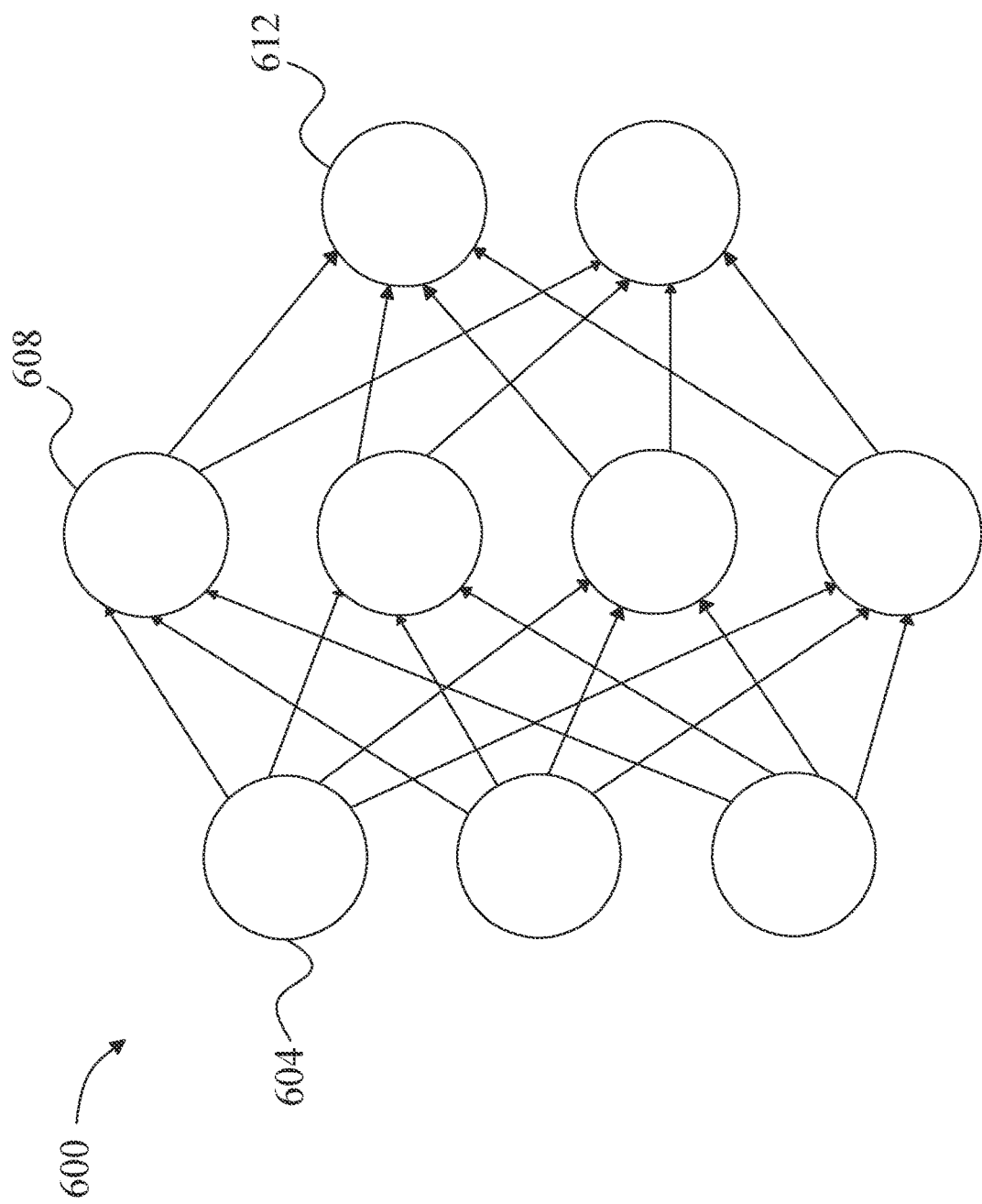
FIG. 6 is a diagram of an exemplary embodiment of a neural network.

Referring now to FIG. 6, an exemplary embodiment of neural network 600 is illustrated. A neural network 600 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 604, one or more intermediate layers 608, and an output layer of nodes 612. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 7:
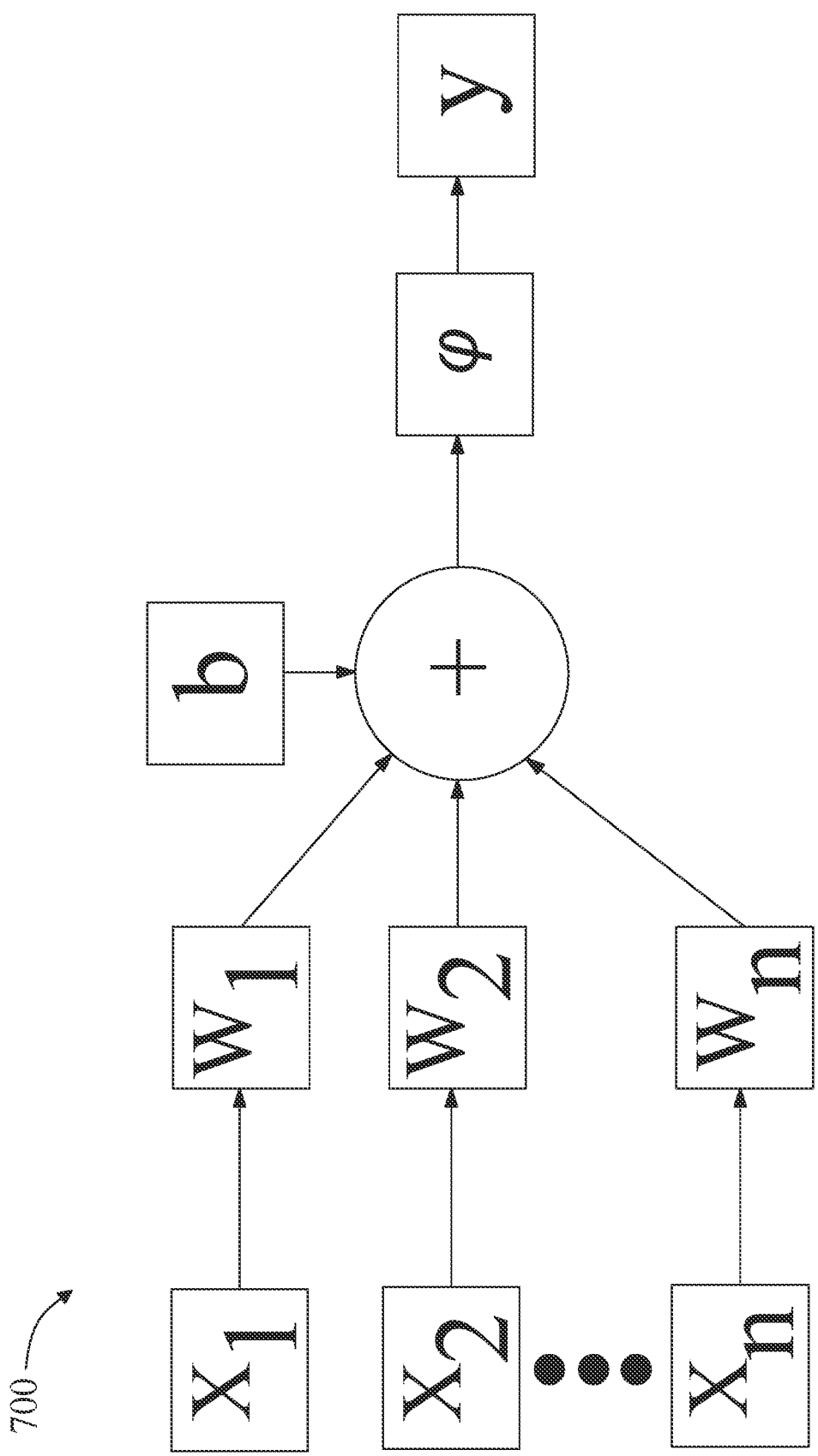
FIG. 7 is a diagram of an illustrative embodiment of a node of a neural network.

Referring now to FIG. 7, an exemplary embodiment of a node 700 of a neural network is illustrated. A node may include, without limitation, a plurality of inputs x, that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some a, an exponential linear units function such as $$f(x) = \begin{cases} x & \text{for } x \geq 0 \\ \alpha(e^x - 1) & \text{for } x < 0 \end{cases}$$

for some value of α (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=a(1+\tanh(\sqrt{2/\pi}(x+bx^r)))$ for some values of a, b, and r, and/or a scaled exponential linear unit function such as $$f(x) = \lambda \begin{cases} \alpha(e^x - 1) & \text{for } x < 0 \\ x & \text{for } x \geq 0 \end{cases}.$$

Fundamentally, there is no limit to the nature of functions of inputs x, that may be used as activation functions. As a non-limiting and illustrative example, node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input x, may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 8:
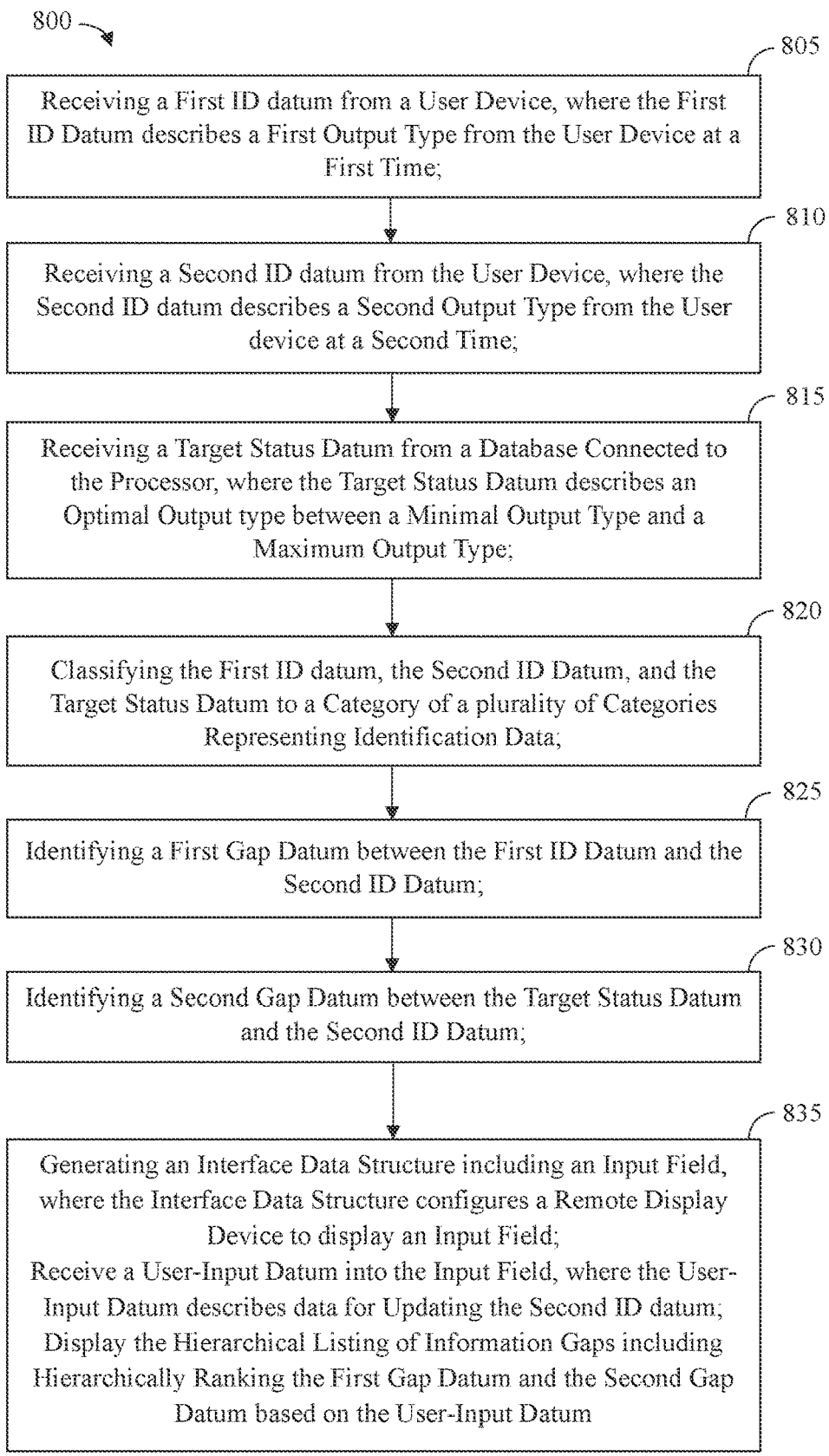
FIG. 8 is a flow diagram of an exemplary method for determining a hierarchical listing of information gaps.

Now referring to FIG. 8, method 800 for determining a hierarchical listing of information gaps for a user is described. At step 805, method 800 includes receiving, by a computing device, a first identification datum from a user device, wherein the first identification datum describes a first output type from the user device at a first time. This step may be implemented as described above, without limitation, in FIGS. 1-7.

Still referring to FIG. 8, at step 810, method 800 includes receiving, by the computing device, a second identification datum from a user device, wherein the second identification datum describes a second output type from the user device at a second time. This step may be implemented as described above, without limitation, in FIGS. 1-7.

Still referring to FIG. 8, at step 815, method 800 includes receiving, by the computing device, a target status datum from a database connected to the computing device, wherein the target status datum describes an optimal output type between a minimal output type and a maximum output type. This step may be implemented as described above, without limitation, in FIGS. 1-7.

Still referring to FIG. 8, at step 820, method 800 includes classifying, by the computing device, the first identification datum, the second identification datum, and the target status datum to a plurality of categories representing identification data. This step may be implemented as described above, without limitation, in FIGS. 1-7.

Still referring to FIG. 8, at step 825, method 800 includes identifying, by the computing device, a first gap between the first identification datum and the second identification datum, wherein identifying the first gap comprises subtracting the first identification datum from the second identification datum. This step may be implemented as described above, without limitation, in FIGS. 1-7.

Still referring to FIG. 8, at step 830, method 800 includes identifying, by the computing device, a second gap between the target status datum and the second identification datum, wherein identifying the second gap comprises subtracting the target status datum from the second identification datum. This step may be implemented as described above, without limitation, in FIGS. 1-7.

Still referring to FIG. 8, at step 835, method 800 includes generating, by the computing device, an interface query data structure including an input field based on hierarchically ranking the first gap and the second gap, wherein the interface query data structure configures a remote display device to display the input field to the user, receive a user-input datum into the input field, wherein the user-input datum describes data for updating the second identification datum; and display the hierarchical listing of information gaps based on the user-input datum.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
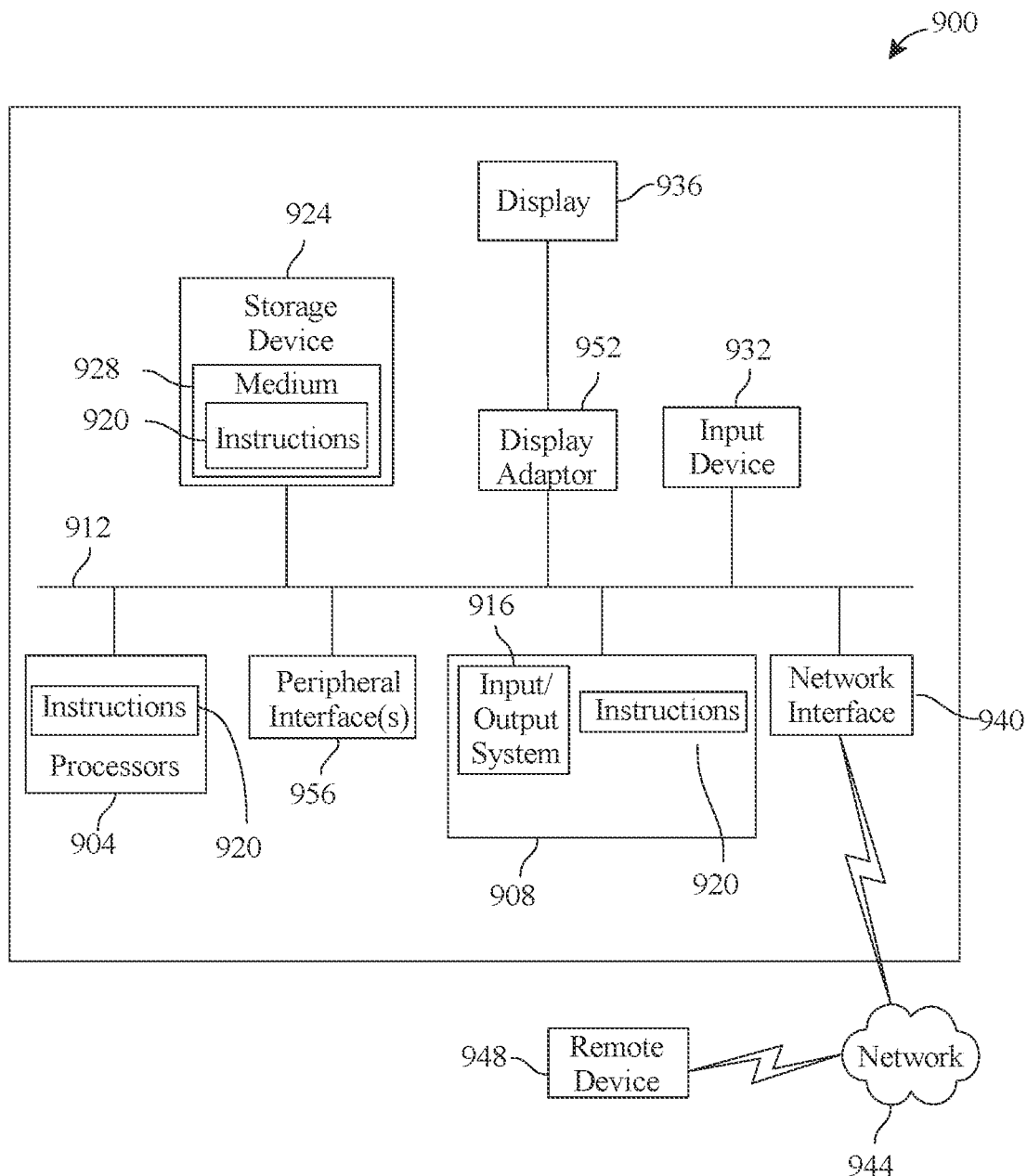
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), system on module (SOM), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate to provide a multiplicity of feature combinations in associated new embodiments. Furthermore, while the foregoing describes several separate embodiments, what has been described herein is merely illustrative of the application of the principles of the present invention. Additionally, although particular methods herein may be illustrated and/or described as being performed in a specific order, the ordering is highly variable within ordinary skill to achieve methods, apparatus, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for determining a hierarchical listing of information gaps, the apparatus comprising:
   a processor;
   a memory connected to the processor, the memory containing instructions configuring the processor to:
   receive a first identification datum from a user device, wherein the first identification datum describes a first output type from the user device at a first time;
   receive a second identification datum from the user device, wherein the second identification datum describes a second output type from the user device at a second time;
   receive a target status datum from a database connected to the processor, wherein the target status datum describes an optimal output type between a minimal output type and a maximum output type;
   classify, using a machine learning model, the first identification datum, the second identification datum, and the target status datum to a category of a plurality of categories representing identification data;
   identify a first gap datum between the first identification datum and the second identification datum;
   identify a second gap datum between the target status datum and the second identification datum;
   generate an interface data structure including an input field, wherein the interface query data structure configures a remote display device to:
   display an input field;
   receive a user-input datum into the input field, wherein the user-input datum describes data for updating the second identification datum; and
   display a hierarchical listing of information gaps including hierarchically ranking the first gap datum and the second gap datum based on the user-input datum.

2. The apparatus of claim 1, wherein generating the interface query data structure further comprises:
   retrieving data describing attributes of a user from a database communicatively connected to the processor; and
   generating the interface query data structure based on the data describing attributes of the user, wherein generating the interface query data structure further comprises:
   determining a norm from the first gap datum to the second gap datum; and
   configuring the remote display device to display a representation of the norm.

3. The apparatus of claim 2, wherein determining the norm from the first gap datum to the second gap datum further comprises:
   calculating, using the machine learning model, an error value based on a difference between the second identification datum and the target status datum, wherein calculating the error value includes training the machine learning model prior to calculating the error value by using sample values describing corresponding output types from the user device at various times;
   generating, using the machine learning model, the norm including an angle value and a distance value based on the error value, wherein the angle value and the distance value describe a divergence value between the first identification datum and the second identification datum.

4. The apparatus of claim 1, wherein generating the target status datum further comprises:
   scoring, using the machine learning model, the hierarchical listing of information gaps by applying an algorithmic model built from a historical dataset, wherein:
   algorithmic model is applied to a new dataset and is configured to track trends associated with at least the second identification datum; and
   the hierarchical listing is configured to be scored between a minimum value and a maximum value.

5. The apparatus of claim 1, further comprising generating an additional input field based on a divergence value, wherein the divergence values describe divergence between the first identification datum and the second identification datum.

6. The apparatus of claim 1, wherein determining the hierarchical listing of information gaps further comprises:
   classifying an instance of the first identification datum to the target status datum;
   determining a proximity of a respective first identification datum to the target status datum calculated based on the first gap datum; and
   adjusting the target status datum based on to reduce the proximity.

7. The apparatus of claim 1, further comprising:
classifying the second identification datum to the target status datum, wherein classifying the second identification datum further comprises:
comparing the second identification datum to the target status datum; and
determining a parity value based on comparison of the second identification datum to the target status datum, wherein the parity value is included within the hierarchical listing of information gaps.

8. The apparatus of claim 5, wherein determining the hierarchical listing of information gaps further comprises:
determining a pattern, wherein the pattern describes user interaction with the user device;
classifying an element of the pattern to the divergence value; and
adjusting the pattern based on a magnitude of the divergence value.

9. The apparatus of claim 1, further configured to evaluate the user-input datum comprising:
classifying one or more new instances of the user-input datum to the target status datum;
generating a divergence value based on the classification; and
displaying the divergence value hierarchically.

10. The apparatus of claim 1, wherein classifying the first identification datum to the category of the plurality of categories further comprises:
organizing categories based on their respective proximity to the minimal output type and the maximum output type;
aggregating an instance of the first identification datum based on the classification; and
classifying aggregated user data to the category having a closest proximity to the maximum output type.

11. A method for determining a hierarchical listing of information gaps, the method comprising:
receiving, by a computing device, a first identification datum from a user device, wherein the first identification datum describes a first output type from the user device at a first time;
receiving, by the computing device, a second identification datum from the user device, wherein the second identification datum describes a second output type from the user device at a second time;
receiving, by the computing device, a target status datum from a database connected to the processor, wherein the target status datum describes an optimal output type between a minimal output type and a maximum output type;
classifying, by a computing device using a machine learning model, the first identification datum, the second identification datum, and the target status datum to a category of a plurality of categories representing identification data;
identifying, by the computing device, a first gap datum between the first identification datum and the second identification datum;
identifying, by the computing device, a second gap datum between the target status datum and the second identification datum;
generating, by the computing device, an interface data structure including an input field, wherein the interface query data structure configures a remote display device to:
display an input field;
receive a user-input datum into the input field, wherein the user-input datum describes data for updating the second identification datum; and
display a hierarchical listing of information gaps including hierarchically ranking the first gap datum and the second gap datum based on the user-input datum.

12. The method of claim 11, wherein generating the interface query data structure further comprises:
retrieving data describing attributes of a user from a database communicatively connected to the processor; and
generating the interface query data structure based on the data describing attributes of the user, wherein generating the interface query data structure further comprises:
determining a norm from the first gap datum to the second gap datum; and
configuring the remote display device to display a representation of the norm.

13. The method of claim 12, wherein determining the norm from the first gap datum to the second gap datum further comprises:
calculating, using the machine learning model, an error value based on a difference between the second identification datum and the target status datum, wherein calculating the error value includes training the machine learning model prior to calculating the error value by using sample values describing corresponding output types from the user device at various times;
generating, using the machine learning model, the norm including an angle value and a distance value based on the error value, wherein the angle value and the distance value describe a divergence value between the first identification datum and the second identification datum.

14. The method of claim 11, wherein generating the target status datum further comprises:
scoring, using the machine learning model, the hierarchical listing of information gaps by applying an algorithmic model built from a historical dataset, wherein:
algorithmic model is applied to a new dataset and is configured to track trends associated with at least the second identification datum; and
the hierarchical listing is configured to be scored between a minimum value and a maximum value.

15. The method of claim 11, further comprising generating an additional input field based on a divergence value, wherein the divergence values describe divergence between the first identification datum and the second identification datum.

16. The method of claim 11, wherein determining the hierarchical listing of information gaps further comprises:
classifying an instance of the first identification datum to the target status datum;
determining a proximity of a respective first identification datum to the target status datum calculated based on the first gap datum; and
adjusting the target status datum based on to reduce the proximity.

17. The method of claim 11, further comprising:
classifying the second identification datum to the target status datum, wherein classifying the second identification datum further comprises:
comparing the second identification datum to the target status datum; and
determining a parity value based on comparison of the second identification datum to the target status datum, wherein the parity value is included within the hierarchical listing of information gaps.

18. The method of claim 15, wherein determining the hierarchical listing of information gaps further comprises:
   determining a pattern, wherein the pattern describes user interaction with the user device;
   classifying an element of the pattern to the divergence value; and
   adjusting the pattern based on a magnitude of the divergence value.

19. The method of claim 11, further configured to evaluate the user-input datum comprising:
   classifying one or more new instances of the user-input datum to the target status datum;
   generating a divergence value based on the classification; and
   displaying the divergence value hierarchically.

20. The method of claim 11, wherein classifying the first identification datum to the category of the plurality of categories further comprises:
   organizing categories based on their respective proximity to the minimal output type and the maximum output type;
   aggregating an instance of the first identification datum based on the classification; and
   classifying aggregated user data to the category having a closest proximity to the maximum output type.

* * * * *